(12) United States Patent
Bader

(10) Patent No.: US 6,365,051 B1
(45) Date of Patent: Apr. 2, 2002

(54) PRECIPITATION-MEMBRANE DISTILLATION HYBRID SYSTEM FOR THE TREATMENT OF AQUEOUS STREAMS

(76) Inventor: Mansour S. Bader, P.O. Box 130248, The Woodlands, TX (US) 77393

(*) Notice: Subject to any disclaimer, the term of this patent is extended or adjusted under 35 U.S.C. 154(b) by 0 days.

(21) Appl. No.: 09/416,320

(22) Filed: Oct. 12, 1999

(51) Int. Cl.[7] .............................. B01D 61/36; C02F 1/54
(52) U.S. Cl. ...................... 210/640; 210/641; 210/729; 210/806; 210/912
(58) Field of Search ................................ 210/640, 702, 210/712, 729, 911, 912, 641, 805, 806; 203/47, 48; 588/20; 423/12

(56) References Cited

U.S. PATENT DOCUMENTS

| 4,476,024 A | 10/1984 | Cheng |
| 4,545,862 A | 10/1985 | Gore et al. |
| 4,728,397 A | 3/1988 | Kjellander et al. |
| 4,781,837 A | 11/1988 | Lefebvre |
| 4,818,345 A | 4/1989 | Jonsson |
| 4,879,041 A | 11/1989 | Kurokawa et al. |
| 5,098,566 A | 3/1992 | Lefebvre |
| 5,102,550 A | 4/1992 | Pizzino et al. |
| 5,587,088 A | * 12/1996 | Bader |

OTHER PUBLICATIONS

Scott, Keith. Handbook of Industrial Membranes, 1st Edition (1995). Elsevier Science Publishers. See pp. 61–64 and 85.*

* cited by examiner

Primary Examiner—Ana Fortuna
Assistant Examiner—Richard W. Ward
(74) Attorney, Agent, or Firm—Fellers, Snider, Blankenship, Bailey & Tippens, P.C.

(57) ABSTRACT

A method of treating an aqueous stream having inorganic material dissolved therein, the method comprising the steps of: (a) adding organic solvent to the aqueous stream in an amount effective to form an inorganic precipitate comprising at least a portion of the inorganic material; (b) removing at least most of the organic solvent from the aqueous stream by vacuum membrane distillation; and (c) after step (b), removing at least most of the inorganic precipitate from the aqueous stream.

22 Claims, 11 Drawing Sheets

PRECIPITATION-MEMBRANE DISTILLATION HYBRID SYSTEM FOR THE TREATMENT OF AQUEOUS STREAMS

BACKGROUND OF THE INVENTION

For instance, within the Department of Energy (DOE) complex, 335 underground tanks were employed to process and store radioactive and chemical mixed wastes generated from weapon materials production over the past 50 years. These tanks hold collectively over 90 million gallons of high-level-wastes (HLW) and low-level-wastes (LLW) in forms of sludge, saltcake, slurry, and supernate. Some of the tanks have exceeded their life expectancy and leaked to contaminate about 470 billion gallons of groundwater.

Most of these tanks contain waste with a diverse portfolio of mainly inorganic anions including nitrate, nitrite, hydroxide, sulfate, and phosphate. Temperature profiles of these tanks vary from near ambient to temperatures over 93° C. Much of the radioactivity arises mainly from strontium, cesium, and to a lesser extent from rubidium, yttrium, barium, technetium, and actinides. Table 1 presents concentrations profiles for some of the DOE aqueous waste streams.

Cesium is the primary radioactive component found in supernatants and salts cakes. Strontium and technetium tend to be concentrated in supernatants and sludge washing liquids. Cesium and strontium are the major source of radiation and heat, while technetium tends to be very mobile in the environment and persist for a long period of time (half-life: 210,000 years). Actinides, however, tend to be concentrated in the sludge portion of the waste, and thus in the soluble portion, their concentrations are very low.

The DOE economic waste minimization strategy was centered on expending separation methods to pretreat the radioactive waste. These methods provide a sequence of processes to partition the waste into a small volume of HLW for deep geologic disposal, and a large volume of LLW for disposal in near-surface facilities. Vitrification, the process of converting materials into a glass-like substance, is currently the preferred HLW immobilization in deep geologic repository. The estimated cost of the vitrification and the repository disposal is about $1 million per canister of glass produced. As such, vitrifying wastes directly is prohibited, and the process is limited to concentrated HLW. Thus, the DOE treatment methods are focused primarily on the separation of the small quantities of radioactive species from the waste bulk. This would result in a small volume of HLW for vitrification, and a larger volume of LLW which can be disposed at a much less expensive cost.

A number of aqueous streams are encountered in tank waste treatment. These streams may include tank waste supernatant, waste retrieval sluicing water, sludge wash solutions, and the like. Several separation techniques are considered for any given tank waste stream. Solvent extraction, particularly by crown ethers, has gained significant consideration for DOE applications in separation of radioactive alkali and alkaline earth cations from liquid streams. Factors such as ion speciation in strong mixed-cation mixtures, and sensitivity to the volume and grade (solid-free) of the liquid stream are under experimentation. Traditional pressure-driven membrane processes such as nanofiltration, ultrafiltration, and microfiltration enhanced with molecular recognition agents attached to flow through membranes have been proposed and tested for selective removal of cesium, strontium, and technetium from aqueous streams. Factors such as membrane applicability and stability, separation selectivity, and capacity are critical issues that are under evaluation. Ion exchangers are currently under development for the removal of cesium and strontium from liquid waste streams. Organic and inorganic exchange materials are employed in the ion exchange process. Although both exchange materials exhibit strong retention for the cesium and strontium, factors such as chemical stability and capacity are yet to be resolved.

After retrieval of liquid waste from storage in tanks, sludge dissolution is needed. One of the specific techniques that is used by the DOE program is the enhanced sludge washing (ESW) process. The objective of the ESW is to remove key non radioactive inorganic species such as sulfate, phosphate, aluminum, and in some cases chromium from the tank waste sludge portion, leaving the radioactive species, primarily strontium and actinides, in the solid phase for vitrification. The process involves first the addition of 3 molar of sodium hydroxide to dissolve aluminum from the sludge. The sludge is then washed with an aqueous solution containing 0.01 molar sodium hydroxide and 0.01 molar sodium nitrate to remove interstitial liquid and any remaining soluble solids. The efficiency of the ESW process is questionable. First, inadequate removal of the key non-radioactive sludge components always results in production of an unacceptably large volume of HLW. Second, substantial volumes of aqueous wash solutions as well as sludge are generated which both require treatment and disposal as LLW. Inspection of Table 1 indicates high concentrations of sodium in forms of hydroxide, nitrate, and nitrite as a result of the ESW process (sodium negatively interferes with vitrification). Sludge handling and disposal is becoming more expensive as burial requirements increase and approved burial sites become less available. Third, excessive settling times of suspended solids with gel formation.

Activities such as sludge retrieval and sludge washing have resulted in excess water in tanks wastes. To conserve tank storage space and reduce the volume of the final waste form, evaporator has been demonstrated in a small scale operation to remove the generated excess water. The objective is to evaporate the aqueous waste to a level approaching the solubility limit of the dissolved salts. Conventional evaporation, however, implies high capital and operating costs. Innovative evaporation techniques are thus of a prime interest.

The DOE is currently seeking processing technologies to treat waste streams directly, or after appropriate separation, to produce environmentally stable, and regulatory acceptable final waste forms. Of particular interest are technologies that can perform highly selective separation of calcium/strontium or complexed technetium from aqueous streams (e.g., groundwater, supernate, slurry). Also, of prime importance are processes that are either capable of directly and selectively separate: (1) radioactive species such as strontium and actinides; or (2) bulk non radioactive inorganic species such as sodium and aluminum from sludge dissolution activities. Processes are also sought for the removal of radionuclides from calcined waste streams (plutonium and other actinides) at high temperatures; particularly processes that: (1) separate inorganic species into concentrated product streams; (2) can withstand a radiolytic environment; (3) can be scaled to processing at rates of 2 to 30 gallons per minute; (4) are simple to construct and operate; and (5) are economically viable.

Although some of the DOE under development emerging technologies individually remove their target contaminants effectively, these technologies would presumably be employed in series, and would each entail separate process requirements, consumption and stripping of materials, effluent streams, and different impacts on vitrification. However, in many severe cases such as the DOE waste streams, a single type system may not be the best answer. Hybrid systems to improve productivity and achieve better separation would be the optimum solutions. As such, there are compelling advantages to a single hybrid processing system that could concentrate radioactive species for small HLW, and evaporate the aqueous phase to produce an ultrapure effluent stream, leaving low volume of concentrated LLW. This invention provides an innovative hybrid process based on combining precipitation with membrane distillation concepts. The precipitation step would perform the highly selective separation of alkaline earth cations (calcium, strontium, barium, and radium), alkali earth cations (rubidium and cesium), and other radioactive species such as yttrium, technetium, and plutonium (if a "suitable anion" is enhanced or introduced) as a small volume of HLW. The precipitation step also has the capability to separate sodium and aluminum from the bulk stream of non radioactive species. This would enable the membrane distillation process to be efficient (minimize the radiolytic environment, and reduce the effect of osmotic pressure) in distilling ultrapure water vapor from the aqueous waste streams, and thus to leave a small volume of LLW.

SUMMARY OF TIE INVENTION

A novel environmentally benign separation process which consists of coupling precipitation with membrane distillation in an integrated hybrid system is invented. The process is deemed to be efficient and cost effective with high potential for significant environmental and industrial impacts. Precipitation is the key step in which a suitable organic solvent is added to an aqueous stream containing inorganic species to form selective precipitates. This step would serve two objectives: (1) selectively separating targeted radioactive inorganics (rubidium, cesium, strontium, barium and radium,) from the bulk of inorganic aqueous stream as a small volume of HLW for direct vitrification; and (2) separating non radioactive inorganic species (sodium, aluminum and others) to reduce the osmotic pressure and the viscosity of the aqueous solution. Once the precipitation step is efficiently established, membrane distillation which is a low temperature gradient process that can take advantage of the wide variations in wastes temperatures takes place to: (1) recover the precipitation solvent (vacuum membrane distillation); and (2) produce an ultrapure effluent stream by concentrating the aqueous stream that contains dissolved inorganic species as LLW (membrane distillation).

Primary candidates for the invented process would be for the treatment of DOE waste streams. An additional application of this process beyond the scope of the DOE waste streams, would be for the treatment of produced water radioactivity Naturally Occurring Radioactive Materials: NORM) in the oil, gas, geothermal and mining industries. Other examples of potential industrial applications include the removal of sulfate and scale salts from: (1) seawater to be used as a water flood in offshore oil and gas reservoirs; (2) cooling towers blowdown streams; (3) feed and/or concentrate streams in pressure-driven membrane processes. Other examples of potential environmental applications include the removal of (1) chloride salts from contaminated groundwater with road deicing salts; (2) transition metals from landfill leachate or groundwater, and (3) other streams resulting from, for instance, plating facilities, washrack facilities, metal cleaning facilities, paint stripping facilities and laundries facilities.

In one aspect, the present invention provides a method of treating an aqueous stream having inorganic materials dissolved therein, the inventive method comprising the steps of (a) adding organic solvent to the aqueous stream in an amount effective to form a precipitate comprising at least a portion of the inorganic material; (b) removing at least most of the organic solvent from the aqueous stream; (c) removing at least most of the precipitate from the aqueous stream to produce an intermediate aqueous product; and (d) distilling the intermediate aqueous product by membrane distillation to produce an aqueous permeate product.

In another aspect, the present invention provides a method of treating an aqueous stream having inorganic material dissolved therein, the inventive method comprising the steps of (a) distilling the aqueous stream by membrane distillation to produce an aqueous permeate product and an intermediate concentrate comprising at least most of the inorganic material; (b) adding an organic solvent to the intermediate concentrate in an amount effective to form a precipitate comprising at least a portion of the inorganic material; (c) removing at least most of the organic solvent from the intermediate concentrate; and (d) removing at least most of the precipitate from the intermediate concentrate to produce a concentrate product and an at least partially purified aqueous product.

Examples of suitable organic solvents employed in the present invention include: isopropylamine, ethylamine, propylamine, diisopropylamine, diethylamine, dimethylamine, and combinations thereof. The organic solvent is preferably isopropylamine, ethylamine, or a combination thereof.

In one aspect, at least a portion of the inorganic material removed by the inventive method can include, but is not limited to, rubidium, cesium, strontium, francium, scandium, yttrium, lanthanum, actinium, chromium, cobalt, cadmium, mercury, nickel, zinc, iron, europium, cerium, praseodymium, neptunium, plutonium, americium, curium, nobelium technetium, ruthenium, iodine (I-129), carbon (C-14), tritium (H-3), cyanide, and combinations thereof.

In another aspect, the present invention provides a method of treating an aqueous stream having inorganic material dissolved therein, the inventive method comprising the steps of: (a) removing volatile organic material from the aqueous stream by vacuum membrane distillation; (b) adding organic solvent to the aqueous stream in an amount effective to form a precipitate comprising at least a portion of the inorganic material; (c) removing at least most of the organic solvent from the aqueous stream; and (d) removing at least most of the precipitate from the aqueous stream.

In another aspect, the present invention provides a method of treating an aqueous stream having inorganic material dissolved therein, the inventive method comprising the steps of: (a) removing volatile organic material from the aqueous stream by vacuum membrane distillation; (b) distilling the aqueous stream by vacuum membrane distillation to produce an aqueous distillate product and a concentrate comprising at least most of the inorganic material; and (c) adding an organic solvent to the concentrate in an amount effective to precipitate at least a portion of the inorganic material; and (d) removing at least most of the precipitate from the concentrate.

In another aspect, the present invention provides a method of producing petroleum, gas, or other products from a subterranean formation using seawater. The inventive method comprises the steps of (a) removing natural sulfate from the seawater; and (b) injecting the resulting treated seawater product into the subterranean formation. Natural sulfate is removed from the seawater in step (a) by (i) adding organic solvent to the seawater in an amount effective to form a precipitate comprising the sulfate, and (ii) removing the precipitate from seawater to produce the treated seawater product. The organic solvent employed in the inventive method is preferably isopropylamine, ethylamine, or a combination thereof.

In yet another aspect, the present invention provides a method of producing petroleum, gas, or other products from a subterranean formation using formation-produced water. The inventive method comprises the steps of: (a) removing natural, inorganic material from the formation-produced water; and (b) injecting the resulting treated water product into the subterranean formation. In step (a), the natural, inorganic material is removed from the formation-produced water by (i) adding organic solvent to the formation-produced water in an amount effective to form a precipitate comprising the inorganic material and (ii) removing the precipitate from the formation-produced water to yield the treated water product. The organic solvent employed in the inventive method is preferably isopropylamine, ethylamine, or a combination thereof The natural inorganic material contained in the formation-produced water will typically comprise at least one of barium, strontium, radium, and Naturally Occurring Radioactive Material.

Further objects, features, and advantages of the present invention will be apparent to those skilled in the art upon examining the accompanying drawings and upon reading the following description of the preferred embodiments.

BRIEF DESCRIPTION OF THE DRAWINGS

For the purpose of illustration of this invention, there are shown in the enclosed figures, precipitation phase diagrams, processes flow sheets for the precipitation-membrane distillation hybrid system to separate of multiple inorganics (non-radioactive, radioactive, and hazardous) and organics from aqueous streams, and vapor pressures of volatile and non-volatile inorganics. It is to be understood that such figures are for the purpose of illustration only, and the invention is not limited thereto.

DESCRIPTION OF THE PREFERRED EMBODIMENT

Membrane Distillation

Figure 1:
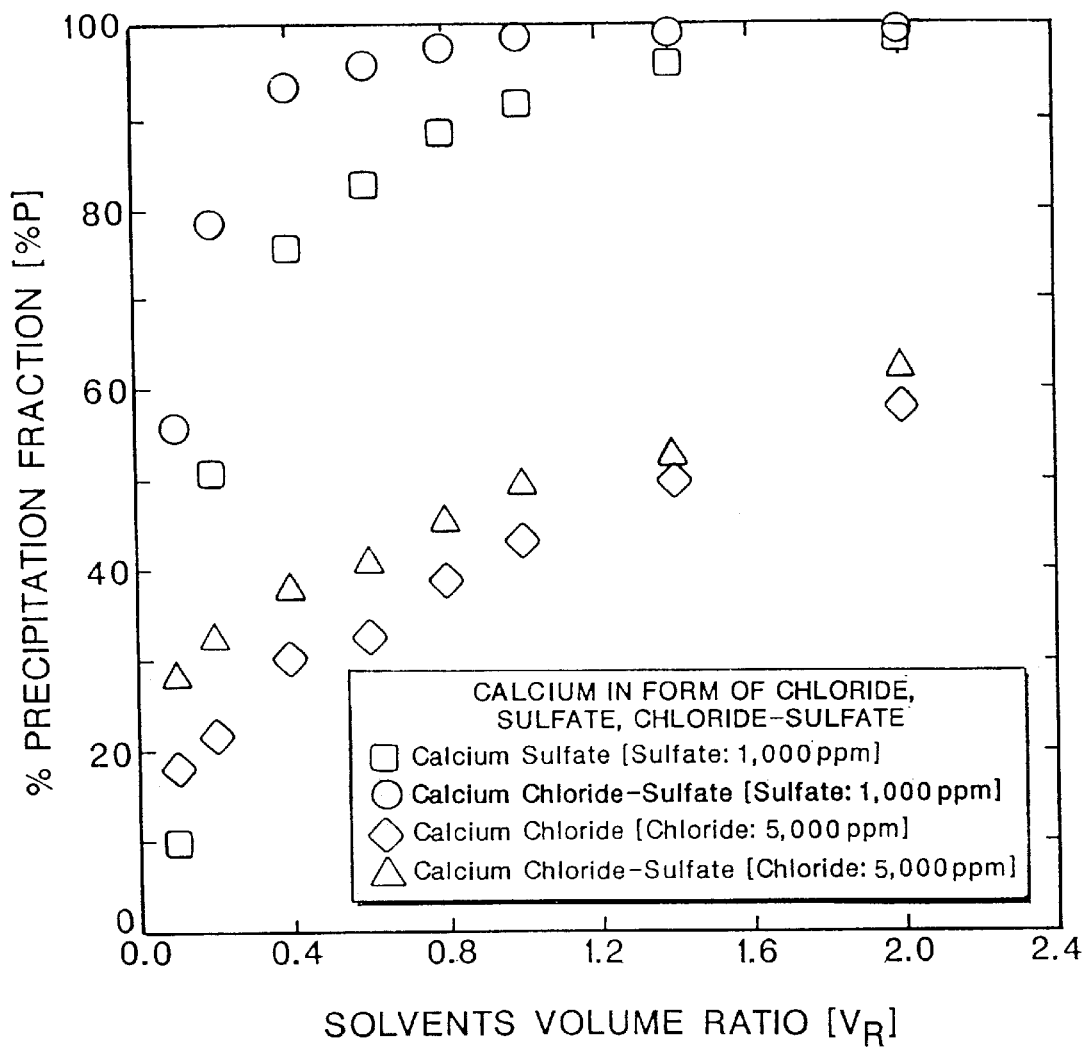
FIG. 1 depicts the precipitation phase diagram of calcium sulfate and calcium chloride from aqueous solution employing ethylamine (EA) as a precipitation solvent.

Membrane Distillation (MD) refers to the transport of the vapor phase through pores of a hydrophobic membrane that separates two liquid solutions. The liquid solution cannot enter the membrane pores unless the applied pressure is greater than the specified "liquid entry pressure" for the porous partition of a given membrane. In the absence of such a pressure, vapor-liquid interfaces are formed on both sides of the membrane pores due to surface tension forces. Under these conditions, if a temperature difference is applied, a vapor pressure gradient will be created on both interfaces. Evaporation will take place at the warm membrane interface (feed), vapor will transport through the membrane pores with a convective and/or diffusion mechanism, and condensation will take place at the cold membrane interface (permeate). The net permeate vapor flux should be from the warm solution to the cold solution.

Several fundamental advantages of the MD process compared to conventional evaporation or pressure-driven membrane processes can be seen. First, the process can take place at atmospheric or sub-atmospheric pressures and at temperatures that may be much lower than the boiling point of a given solution. Any form of low grade or waste heat such as existing low temperature gradients typically available in industrial processing plants, solar energy, geothermal or wave energy and the like can be employed with the MD process. In the case of the DOE tanks wastes, for instance, the wide variations in waste temperature (25–93° C.) would be ideal for the MD process. Second, the evaporation surface of the MD process can be made similar to the typically available various pressure-driven membrane modules (e.g., hollow fiber, flat and tubular membranes, etc.). The modularity of the MD allows the addition of processing capacity as needed, flexibility not available with evaporation technologies. Third, design issues such as mist, corrosion and scaling are minimal, and if they exist, can be eliminated. Fourth, the produced distillate from a solution containing non-volatile inorganics is expected to be ultrapure (entrainment of dissolved species, as the case with pressure-driven membrane, is avoided). Reducing costs (capital and operating) are the definite advantage of MD over conventional evaporation or pressure-driven membrane processes.

The MD process can be evaluated in terms of the permeate vapor flux as a function of the temperature difference, vapor pressure difference, tangential velocity or flow rate, and feed concentration. As such, the apparent simplicity of the MD process obscures complex and simultaneous heat and mass transfer interactions. A progressive increase in solutes concentration on the warm side of the membrane will dramatically reduce the permeate vapor flux, and in some cases, leads to completely cease or even reverse the flux (osmotic distillation). For instance, U.S. Pat. No. 4,781,837; and 5,098,566 were based on employing such osmotic reverse flux as a driving force between two fluids in membrane distillation apparatus (e.g., concentrate dilute solution such as fruit juice using seawater as a stripping stream). The flux decay is attributed to the reduction of the driving force due to a drastic: (1) decrease in the vapor pressure (increase in the osmotic pressure); and (2) increase in the viscosity (decrease in the mass transfer coefficient) of the warm solution. This would substantially affect the attractiveness of the MD process. Increasing throughput is the critical performance factor that would make MD practically and economically viable for gaining industrial acceptance.

U.S. Pat. Nos. 3,340,186; 4,476,024; 4,545,862; 4,728,397; 4,818,3455; 4,879,041; and 5,102,550 were focused on the internal design of the membrane distillation module to increase the productivity by improving the heat transfer (e.g., direct contact between the membrane and the condensation surface, different designs for air gap between the membrane and the condensation surface; hollow fiber module devices). None of these patents has focused on improving and expanding the applicability of the MD for treating liquid streams that are considered untreatable by the MD (process limitations).

Table 1 reveals the osmotic pressures ($\pi$) as a function of temperatures of each basic salt in the NCAW and DSSF-7 waste streams. For instance, the osmotic pressures of sodium hydroxide in the DSSF-7 at 45° C. is 4185 psia. This would make the application of pressure-driven membrane processes such as reverse osmosis to such a stream practically impossible (driving force is the difference between applied and osmotic pressures). With such extreme wastes, the practicality of the MD process hinges on its ability to provide steady and acceptable rate of permeate vapor flux. However, this would depend on effectively controlling the solution vapor and osmotic pressures, and aqueous solubilities of the basic salts in the solution. The vapor and the osmotic pressures are directly related to salts concentrations in the solution. When the aqueous solubilities limits of basic salts are very high, and as the evaporation takes place, the viscosity of the solution will increase with the increase of salts concentrations. This would lead to significantly depress the permeate vapor pressure across the membrane, and elevate the osmotic pressure. As such, controlling basic salts concentrations in the feed solution is a critical factor equivalent to inducing and controlling the temperature as a driving force between the warm and cold streams. This can be accomplished by optimizing a pre-concentration step such as the precipitation process. Precipitation, as an enabling process, would make direct contributions to the productivity of the MD process.

Precipitation

The selection of an organic solvent is the most significant aspect in the precipitation process. The suitable solvents are those which have the capability to meet two basic criteria: (1) suitability to precipitate targeted inorganic species from aqueous solutions; and (2) suitability for overall process design.

The selected organic solvent must be miscible with the aqueous phase. Of equal importance, targeted inorganic salts must be sparingly soluble (preferably insoluble) in the organic solvent. The addition of such a solvent to an inorganics-aqueous solution leads to capture of part of the water molecules and reduces the solubility of inorganics in water which forms insoluble precipitates. The presence of a "suitable anion" in a targeted inorganic-aqueous mixture plays an important role in affecting and characterizing the precipitation step. The role of such an "anion" can be seen in controlling the rate of change in the pH values, and in forming a basic salt, preferably with limited aqueous solubility, which by precipitation, reduces the cation concentration. As such, the nature of the influence of the organic solvent on the hydration of a basic salt needs to be assessed. Such an influence can be determined by studying the solubility of the basic salt in mixed-solvents media (water and organic). Solubility is the obvious thermodynamic property of concern in forming and affecting salts precipitates.

As such, I have developed a fundamentally-based practical framework derived from basic thermodynamic principles of solid-liquid-vapor equilibrium criteria to correlate and predict the precipitation of salts from aqueous solutions using organic solvents. The solubility of a given salt in a mixed-solvent mixture is related to solubilities of such a salt in each of the pure solvents (water and organic) using the excess Henry's constant approach. The Wohl's expansion is then employed to model the excess Gibbs free energy function. An optimum model equation is obtained:

$$\ln[1-P] = \ln\left[\frac{x_{1,m}}{x_{1,2}}\right] \quad (1)$$

$$= \theta_3 \ln\left[\frac{x_{1,3}}{x_{1,2}}\right] - \theta_2\theta_3[2\theta_3 - 1]\frac{v_1}{v_3}\Lambda_{32} + 2\theta_2\theta_3^2\frac{v_1}{v_2}\Lambda_{23}$$

where P is the precipitation fraction, $x_{l,m}$ is the solubility of a given salt in a given mixed-solvent mixture (water and organic), $x_{1,2}$ is the solubility of a given salt in pure water solvent, $x_{1,3}$ is solubility of a given salt in pure organic solvent, $\theta_3$ is the salt-free volume fraction of organic solvent, $\theta_2$ is the salt-free volume fraction of water solvent, $v_i$ is the molar volume of species i (1: salt; 2: water; 3: organic solvent), and $\Lambda_{32}$ and $\Lambda_{23}$ are solvent-solvent (water-organic) interaction parameters.

In the absence of experimental precipitation data, Equation (1) can be employed to check the suitability of a given organic solvent for the precipitation of a targeted inorganic species by estimating the solubility of a given salt in pure organic solvent, $x_{1,3}$. Precipitation phase diagrams can also be constructed using pure component properties. In such a case, vapor-liquid phase equilibrium data are needed to obtain the solvent-solvent (water-organic) interaction parameters ($\Lambda_{32}$ and $\Lambda_{23}$) employing the excess Gibbs free energy function as follows:

$$\frac{g^E}{RT} = \sum_{i=2}^{3} x_i \ln\gamma_i = x_2\ln\gamma_2 + x_3\ln\gamma_3 \quad (2)$$

$$= \theta_2\theta_3^2\Lambda_{23}\left[\frac{x_2v_2 + x_3v_3}{v_2}\right] + \theta_2^2\theta_3\Lambda_{32}\left[\frac{x_2v_2 + x_3v_3}{v_3}\right]$$

where $x_2$ is the solubility mole fraction of water, $\gamma_2$ is the activity coefficient of water, $x_3$ is the solubility mole fraction of organic solvent, and $\gamma_3$ is the activity coefficient of organic solvent. Experimental measurements, or group contribution models such the UNIFAC model, or any suitable excess Gibbs free energy model function can be employed to provide the activity coefficients data for the aqueous-organic mixture. Once $\Lambda_{32}$ and $\Lambda_{23}$ are obtained from Equation (2), then they can be employed in Equation (1) along with pure component properties to determine the solubility of a given salt in the organic solvent, $x_{1,3}$ (the most important criteria in evaluating the suitability of the organic solvent), and to construct the precipitation phase diagram.

Equation (1) can also be used to dramatically reduce the amount of experimental precipitation data. For instance, carefully conducted precipitation measurements performed on systematically selected aqueous streams containing inorganic species can be used to evaluate the interaction parameters, and more importantly, to furnish the basis for generalization of such parameters to permit interpolation and extrapolation to different concentration levels (inorganic species or organic solvents). Such generalizations are of particular importance since complete studies of all possible aqueous streams containing different inorganic species at different concentration levels are obviously infeasible.

For ease of recovery and recycle, the selected organic solvent must have favorable physical properties such as low boiling point, high vapor pressure, high relative volatility, and no azeotrope formation with water. From a process design standpoint, the selected organic solvent must have low toxicity since traces of the organic solvent (ppb to ppm levels) always remain in the discharge stream. The solvent vapors are also of prime health and environmental concerns. Furthermore, the selected organic solvent must be chemically stable, compatible with the process, and relatively inexpensive. These characteristics are very important because of their economic and environmental impacts on the overall process design. The practicality of the precipitation process depends on the capability of effectively recovering and recycling the precipitation agent. Vacuum membrane distillation (VMD), as an enabling process would make direct contributions to the economy of the precipitation process.

In my preliminary work, several organic solvents have been identified for potential use in the precipitation step. The identified solvents are amines selected from a group which includes isopropylamine (IPA), ethylamine (EA), propylamine (PA), diisopropylamine (DIPA), diethylamine (DEA), and dimethylamine (DMA). However, IPA and EA are the preferred precipitation solvents. The preference of IPA and EA is attributed to their high precipitation abilities with different basic salts, favorable physical properties (boiling point: 32.4° C. for IPA and 16.6° C. for EA; Vapor Pressure: 478 mmHg at 20° C. for IPA and 760 mmHg at 16.6° C. for EA); and minimal environmental risks (e.g., IPA salts have been used as a herbicide for agricultural purposes). Vapor-liquid equilibrium calculations indicate that 99.9% recovery of IPA or EA from the aqueous phase can be achieved by a vacuum system.

Figure 2:
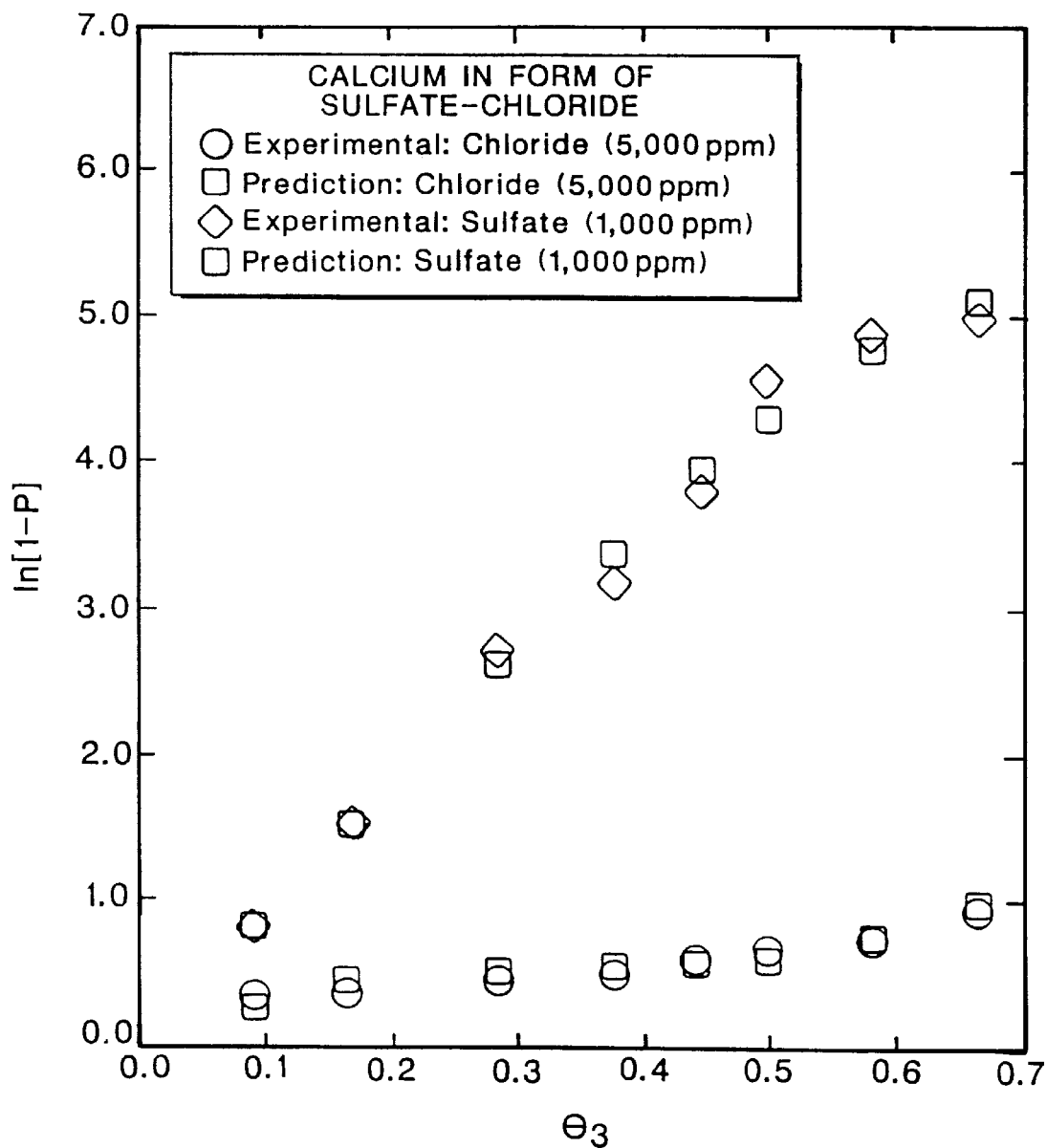
FIG. 2 depicts the predicted precipitation phase diagram of calcium sulfate and calcium chloride from aqueous solution employing ethylamine (EA) as a precipitation solvent.

The precipitation process can be evaluated in terms of the precipitation fraction (P) as a function of the solvents volume ratio ($V_R$), that is the ratio of the organic solvent volume to the aqueous volume. For instance, the precipitation of a combined salt contains sulfate ion at 1,000 ppm and chloride ion at 5,000 ppm in form of calcium employing EA as a precipitation solvent will be used for illustrative purposes. FIG. 1 reveals the precipitation of sulfate ion from calcium sulfate system, chloride ion from calcium chloride system, and sulfate ion and chloride ion from calcium chloride-sulfate system. The precipitation of the sulfate ion at 1,000 ppm from the calcium chloride-sulfate system is significantly higher than the precipitation of sulfate ion at 1,000 ppm from calcium sulfate system, particularly at the lower values of the $V_R$ (0.1 to 1.0). The precipitation of chloride ion at 5,000 ppm from calcium sulfate-chloride system is relatively higher than the precipitation of chloride ion at 5,000 ppm from calcium chloride system, particularly at $V_R$ values of 0.1 to 1.0. This would indicate that the presence of combined sulfate and chloride ions in form of calcium has a significant positive effect on the precipitation of sulfate ion, and to a lesser extent, on the precipitation of chloride ion. FIG. 2 demonstrates the capability of Equation (1) in accurately predicting the precipitation phase diagram of sulfate ion at 1,000 ppm and chloride ion at 5,000 ppm in from calcium chloride-sulfate system using EA as a precipitation solvent.

Figure 3:
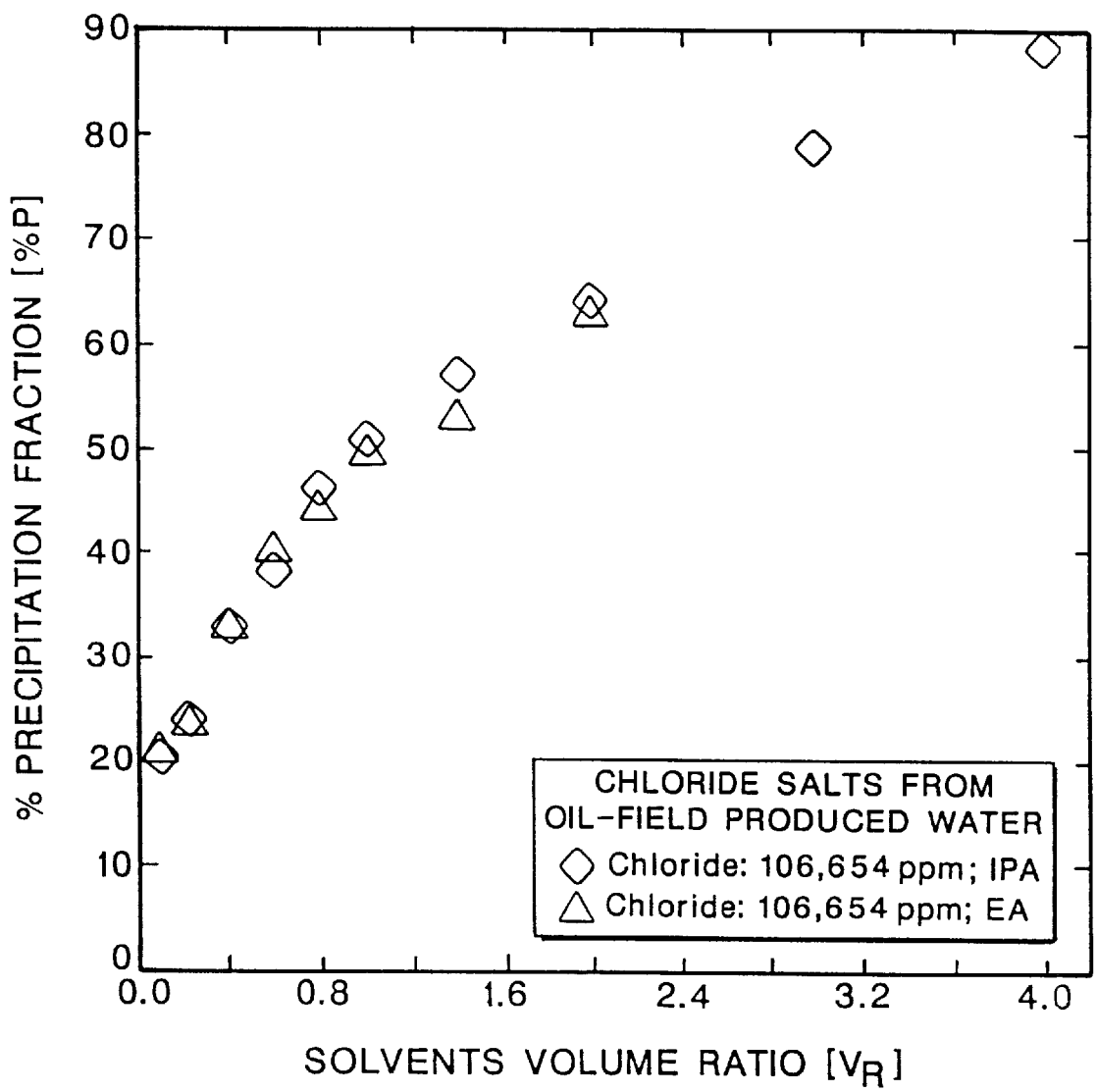
FIG. 3 depicts the precipitation phase diagram of chloride ion from oil-field produced water employing ethylamine (EA) and isopropylamine (IPA) as precipitation solvents.
Figure 4:
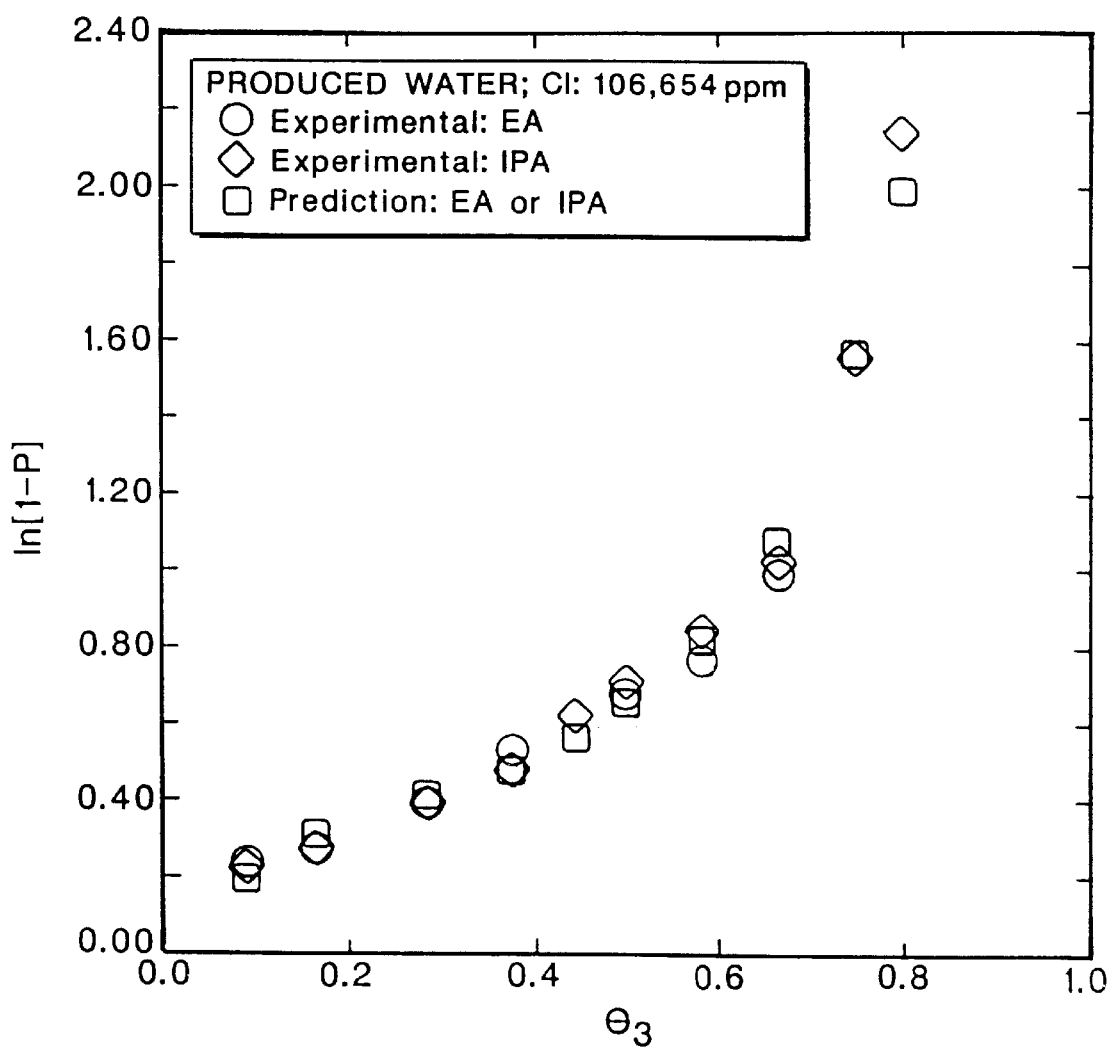
FIG. 4 depicts the predicted precipitation phase diagram of chloride ion from oil-field produced water employing ethylamine (EA) and isopropylamine (IPA) as precipitation solvents.

Another illustrative example, is the precipitation of chloride (106,654 ppm) and sulfate (43 5 ppm) ions from oil-field produced water using both IPA and EA as precipitation solvents. The sulfate ion was completely precipitated in the first stage at a $V_R$ of 0.1 by both IPA and EA. However, the precipitation of chloride ion by IPA over the studied range of $V_R$ extended from 0.1 to 4.0 were 20.4% to 88.3%. A similar precipitation trend was observed for chloride ion at 106,654 ppm from produced water using EA as a precipitation solvent. FIG. 3 reveals the precipitation of chloride ion at 106,654 ppm from oil-field produced water by both IPA and EA. FIG. 4 demonstrates the ability of Equation (1) to accurately predict the precipitation phase diagram of chloride ion form of oil-field produced water using IPA and EA as precipitation solvents.

Vacuum Membrane Distillation

Vacuum Membrane Distillation (VMD) is identical to the MD process except that the permeate pressure is lowered below the equilibrium vapor pressure by a vacuum system (condensation of the permeate takes place outside the membrane module). The driving force is the difference between the equilibrium vapor pressure and permeate pressure. The operation scheme of the VMD is somewhat similar to the scheme of the pervaporation (PV) process. However, the distinctive difference between VMD and PV lies in the role of the membrane. In the PV process, a dense non-porous hydrophilic membrane is used in which the feed solution diffuses through the membrane, and thus vapor-liquid equilibrium selectivity is irrelevant. VMD is an equilibrium-based process, where the employed thin porous hydrophobic membrane does not interfere with the selectivity associated with the vapor-liquid equilibrium, and evaporation occurs directly from the feed solution. As such, the permeate flux of the VMD is expected to be larger than in the PV. When vapor-liquid equilibrium is favorable, VMD is more effective than PV.

The existence of a thin-film boundary layer at the feed side of the membrane surface gives rise to both the concentration and temperature polarization phenomenon. The effect of the concentration polarization on the permeate flux is more pronounced, while the effect of the temperature polarization is expected to be marginal. As such, the net permeate flux is dominantly mass transfer, and thus the separation factor is completely controlled by the concentration polarization.

Precipitation-Membrane Distillation Hybrid System

Figure 5:
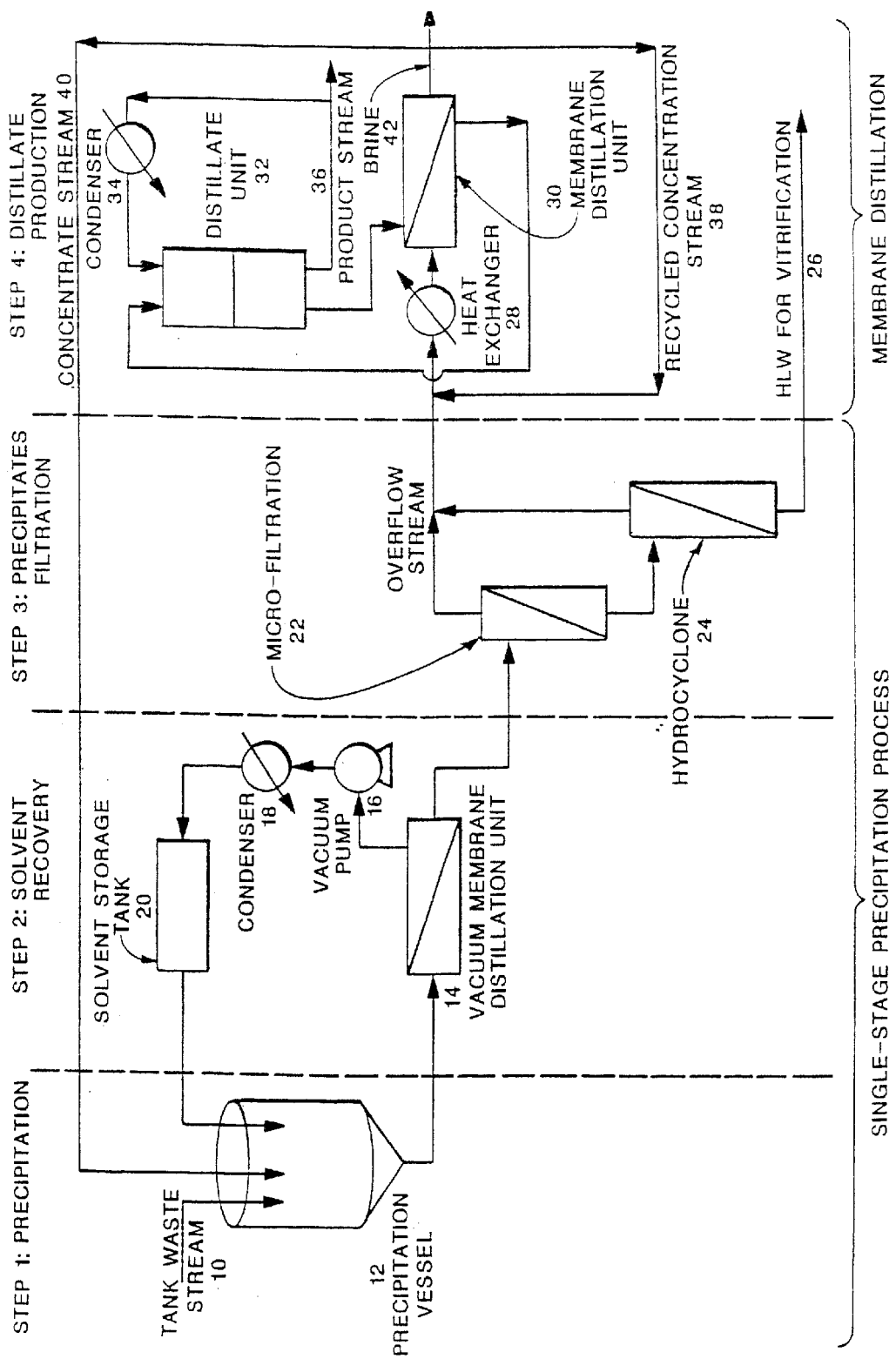
FIG. 5 depicts a simplified flow sheet for a single-stage precipitation process combined with membrane distillation in a hybrid system.

Reference is now made to FIG. 5, which depicts a simplified possible flow sheet illustrating the coupling of the precipitation with the MD process in a hybrid system to treat extreme inorganic-aqueous streams such as the DOE wastes. In the first step, the aqueous waste stream [10] will be intermixed with an organic solvent (e.g., IPA or EA) in a precipitation vessel [12] to cause selective and instantaneous precipitates. The volume ratio of the organic solvent to the aqueous waste stream is a critical factor that needs to be carefully optimized based on the aqueous waste profile (chemical, physical and radioactive or non-radioactive identities of inorganic species, concentration levels, and numbers of inorganic anions present in the aqueous stream).

In the second step, a VMD system will be employed to recover and reuse the valuable organic solvent that is used in the precipitation step as a precipitation agent. The stream that is resulted from the precipitation vessel will be fed into the membrane fibers of the VMD unit [14]. A porous hydrophobic membrane will be situated in a hollow-fiber module to construct the VMD unit. Any commercial hydrophobic membrane with characteristics including 0.2 $\mu$m of nominal pore radius; 178 $\mu$m of membrane thickness; 80% of membrane porosity; and 41 psia of liquid entry pressure (or relatively similar characteristics) can be used in the VMD unit. The hydrostatic pressure at the VMD feed stream solution should be kept below the specified "liquid entry pressure" of the membrane. A vacuum pump [16] will be used to lower the permeate stream pressure below the equilibrium pressure in the feed side of the membrane. The permeate stream that contains the recovered organic solvent will be condensed in a condenser [18], collected in a solvent storage tank [20], and recycled to the precipitation vessel [12] as needed. The VMD step serves three objectives: (1) recover effectively and economically the organic solvent (volatility of IPA or EA significantly increases in the presence of relatively high concentrations of inorganics); (2) enhance the retention precipitation time and thus precipitates become more dense and readily filterable (third step); and (3) prevent the negative interference of the volatile organic solvent vapor with the aqueous vapor permeate flux in the MD process (fourth step).

In the third step, formed precipitates will be separated by a combination of microfiltration (MF) [22] and hydrocyclone (HC) [24] units from the concentrate stream of the VMD unit. MF is a low pressure unit that can be used to filter precipitates with approximate size of 0.02 to 10 $\mu$m. Although dissolved inorganic species are not retained by MF membranes, supersaturation of some inorganic precipitates may occur, which may cause potential membrane fouling. As such, if the size of formed precipitates is greater than 5 $\mu$m, which is the critical cut-off for HC, HC should replace MF. The preference of HC is attributed to its versatility, flexibility, simplicity, and low operating cost. The under flow (concentrate) of the MF stream [22] (about 25% of the feed volume) which contains dense precipitates with sizes are possibly greater than 5 $\mu$m will, in turn, be delivered to the HC unit [24] to further concentrate precipitates and to minimize the volume of the under flow stream (less than 2% of HC feed volume).

The over flow streams that are resulted from both MF and HC (more than 98% of the total feed volume) will be fed into the core of the membrane fibers in the MD unit [30] at higher temperatures (e.g., 35 to 65° C. or possibly higher) via a heat exchanger or a source of low heat or waste heat or heat regulator (as in the case of some of the DOE tank waste with temperatures reach 95° C.) [28]. A porous hydrophobic membrane will be situated in a hollow-fiber module to construct the MD unit. Any commercial hydrophobic membrane with the following characteristics: 0.2 $\mu$m of nominal pore radius; 178 $\mu$m of membrane thickness; 80% of membrane porosity; and 41 psia of liquid entry pressure or relatively similar characteristics can be used in the MD unit. The cooling stream will be pumped from a distillate unit [32] and circulated around the membrane fibers in the MD unit [30] (counter-current) at a constant temperature (e.g., 20° C.), which is lower than the warm stream temperatures. The circulation velocity will be kept the same at both sides of the membrane (warm and cold). The pressure difference between the warm and the cold streams will be kept below the specified "liquid entry pressure" of the membrane. The distillate unit [32] will be linked to a condenser [34] to maintain the cold (permeate) stream temperature. The MD unit [30] will ultimately produce an ultra-pure permeate stream [36]. The MD concentrate stream will be: (1) first recycled to the MD feed stream [38]; (2) then recycled [40] to the precipitation vessel [12] (as the concentrations of norganics build-up in the MD concentrate stream significantly increase); and/or (3) partially or completely disposed as LLW [42] containing highly concentrated dissolved inorganic species.

It should be pointed out that the membrane materials and modules are the same in both the vacuum membrane distillation and membrane distillation units. The preference of the hollow-fiber module in these units is attributed to the high ratio of membrane surface area per unit volume compared, for instance, to a flat-sheet module. Optimization on the conditions of operation needs to be carefully carried out on each processing step to provide a fully efficient and integrated precipitation-membrane distillation hybrid process.

Figure 6:
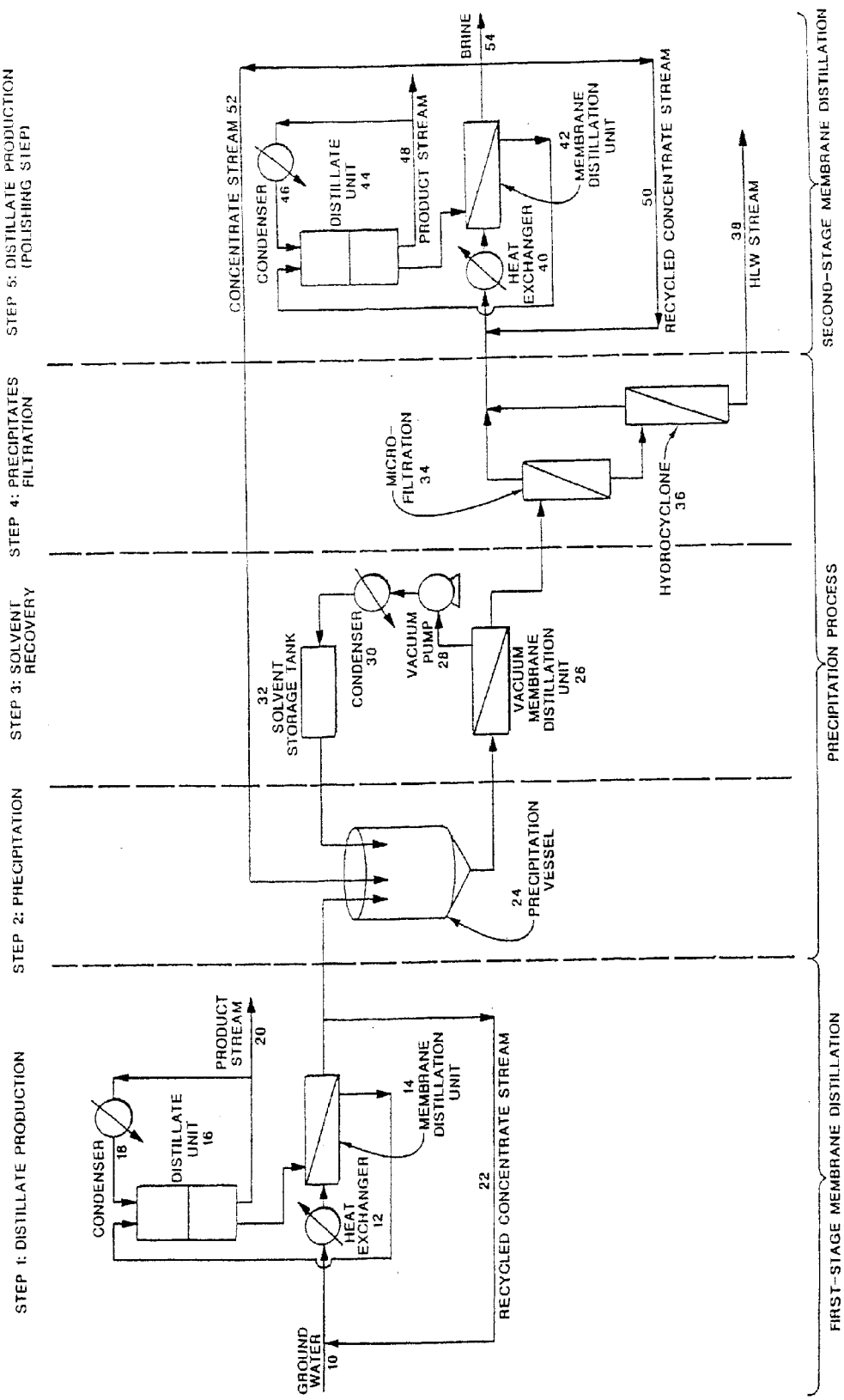
FIG. 6 depicts a simplified flow sheet for a single-stage precipitation process combined with dual-stage membrane distillation in a hybrid system.

Reference is now made to the concentration profiles for some of the DOE waste streams as given in Table 1, which represent three extreme cases. In the case of N-Springs (groundwater) stream, as shown in FIG. 6, two-stage MD will be used in conjunction with the precipitation process. Since inorganics concentrations in the groundwater are generally very low with trace concentrations of radioactive strontium, the first-stage MD [10–22] will be served to produce ultra-pure permeate stream. The MD concentrate stream [22] will be first recycled to the MD feed stream. As the concentrations of inorganics increase in the MD concentrate stream due to continues evaporation, the precipitation process [24–38] will then take place (precipitation step by organic solvents, VMD step to recover organic solvents, and the filtration-clarification step to remove precipitates) to treat the first-stage MD concentrate stream. The purpose of the precipitation process is to serve as an enabling posttreatment for selective and effective separation and concentration of non-radioactive and radioactive alkaline earth cations such as strontium, barium, and calcium in form of sulfate as a very small volume of HLW for possible direct vitrification (hydrocyclone under flow stream). Since it is groundwater, a second-stage MD system [40–54] can also be used, if needed, as a polishing step to completely purify the overflow stream that is resulted from the filtration units (microfiltration and hydrocyclone). The second-stage MD concentrate stream will be either: (1) recycled to the feed stream of the second-stage MD [50]; and/or (2) partially recycled to the precipitation vessel [52]; and/or (3) discharged as brine [54].

Figure 7:
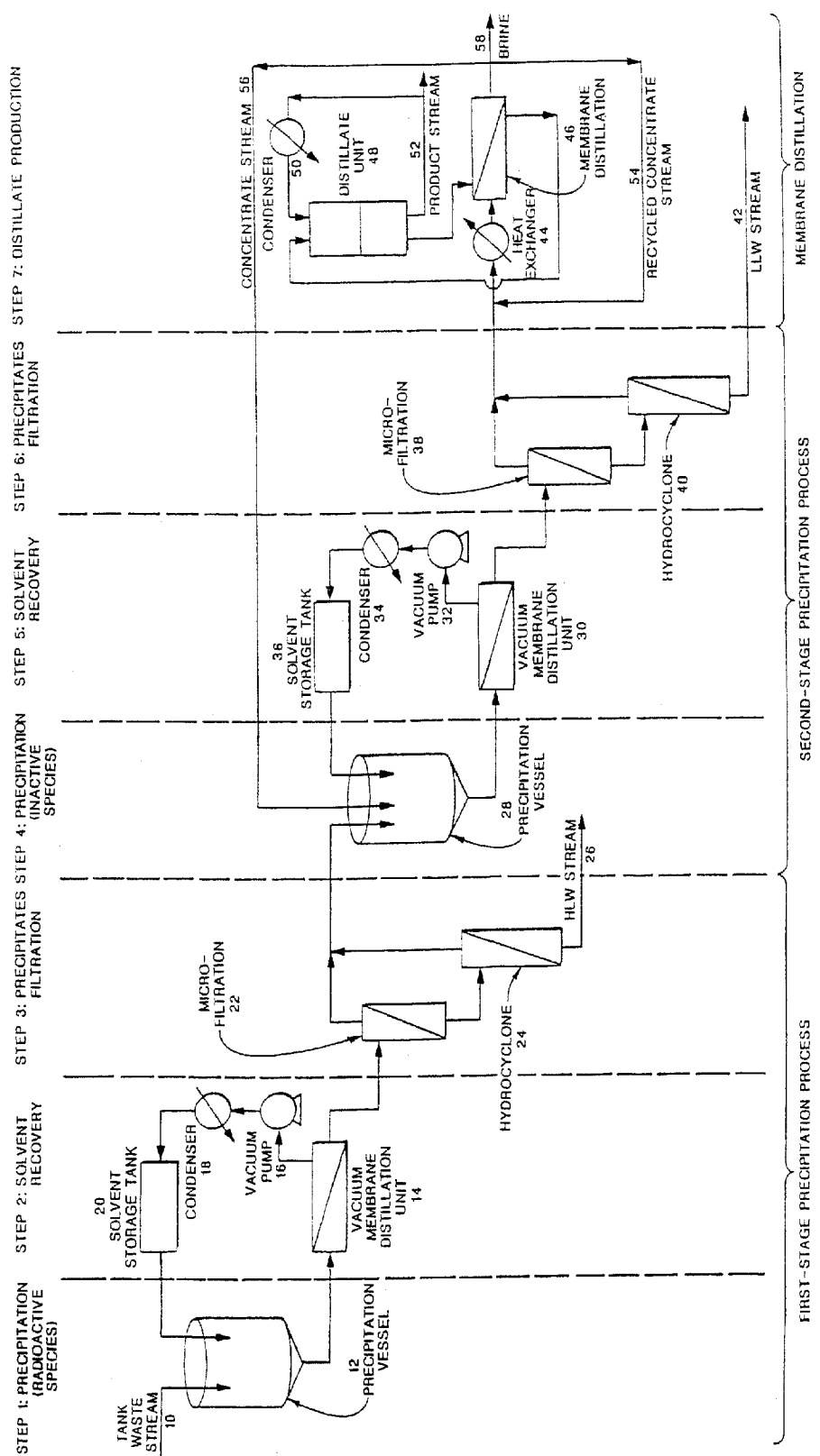
FIG. 7 depicts a simplified flow sheet for a dual-stage precipitation process combined with membrane distillation in a hybrid system.

In the case of the NCAW stream, the concentrations of sodium sulfate, sodium hydroxide, and aluminum nitrate are significantly high. Sodium, aluminum, and sulfate ions interfere negatively with the vitrification process. Furthermore, both sodium hydroxide and aluminum nitrate exert very high osmotic pressures, which significantly hinder the productivity of the MD process. In this case, a two-stage precipitation process combined with single-stage MD will be carried out as shown in FIG. 7. In the first-stage of precipitation [10–26], sulfate ion will be partially targeted for selective and efficient removal of cesium (radioactive species of ultimate concerns) as HLW [26] for possible direct vitrification (hydrocyclone under flow stream). In the second-stage of precipitation [28–42], the presence of both sulfate and phosphate ions can be used effectively for the removal of sodium and aluminum (which also lead to significant precipitation of hydroxide, nitrate and nitrite ions). Phosphate, as confirmed by my preliminary data, would be very suitable for the precipitation of monovalent, divalent, and trivalent cations. The second-stage precipitation drastically reduces the osmotic pressures of the stream, which in turn, makes the MD step [44–58] efficiently applicable to such harsh streams to produce an ultra-pure permeate stream.

In the case of the DSSF-7 stream, the concentrations of both sulfate and phosphate in form of sodium are lower than in the NCAW stream, while the concentrations of sodium hydroxide and aluminum nitrate are significantly higher than in the NCAW. As shown in FIG. 7, the two-stage precipitation process coupled with the MD process will take place. In the first-stage of the precipitation process [10–26], the presence of chloride combined with the of sulfate and phosphate in the DSSF-7 stream will be utilized partially and effectively to enhance the selective separation of both cesium and strontium as prime radioactive targets. Once this is established in the first-stage of precipitation, sulfate, phosphate, and the significant presence of hydroxide, nitrate, and nitrite can then be targeted to separate sodium and aluminum in the second-stage of the precipitation process [28–42], which would make the MD step [44–58] applicable to such waste stream for effective purification.

It should be mentioned that if sulfate ion needs to be enhanced for effective precipitation of alkaline earth cations, a small amount of hydrolytic agent such as sulfamic acid can be added as follows: $NH_2HSO_3+H_2O=NH_4^++H^++SO_4^{-2}$. The decomposition of sulfamic acid by hydrolysis (also by utilizing nitrite ion in the stream) would result in releasing sulfate, which would lead to enhance the precipitation of sodium and influence the precipitation of hydroxide, nitrate (also in form of aluminum) and nitrite. It should also be mentioned that the generation of hydrogen ion as a result of the hydrolysis of sulfamic acid is minimal (e.g., radiolysis of some of DOE tank waste generates hydrogen, which can be accumulated in explosive concentrations if not vented or removed).

The precipitation process can be envisioned as: (1) a selective process (possibly as a stand alone) for the separation of radioactive and hazardous inorganics to leave a small volume of HLW; and (2) an enabling process (pre-treatment or post-treatment) to be combined with MD (or other separation processes such as pressure-driven membrane processes) for the concentration of non-radioactive species to leave a relatively acceptable volume of LLW.

The other issue of the DOE waste tanks is the removal of technetium and trivalent actinides including plutonium. Technetium can be precipitated by targeting pertechnetate or sulfide as suitable anions, where both IPA and EA are very effective as precipitation solvents. Technetium usually exists in the mobile form of the pertechnetate ($TcO_4$). Plutonium and other actinides (americium, curium, neptunium) can be precipitated in form of oxalate or chloride. Plutonium in some waste exists in the form of chloride ($PuCl_3$).

OTHER POTENTIAL APPLICATIONS

Treatment of NORM in Produced Water

In most oil-field produced waters the dominant anion is chloride with the exception of a few cases where sulfate and bicarbonate exceed chloride by weight. Chloride rich oil-field produced waters, however, are divided into two major subtypes: (1) those in which sodium is dominant over calcium; and (2) those in which calcium is relatively abundant. The salinity of oil-field produced waters is commonly 5 to 10 times the salinity of seawater. Most of the very saline oil-field produced waters are relatively high in calcium. Chloride rich produced waters that are high in calcium are generally high in strontium, barium, and in some cases radium. The availability of radium in chloride-rich produced waters suggests that the decay chain of radium (NORM) are common and thus such waters can become radioactive.

No existing federal regulations specifically address NORM wastes handling and disposal, and most NORM wastes are not regulated as hazardous wastes. However, individual states have taken responsibilities for developing regulatory programs. Most state regulations, except California, approve the following disposal methods without treatment: (1) burial at LLW facilities (U.S. Ecology, Washington; Envirocare, Utah); (2) down-hole disposal via encapsulation inside the casing of plugged and abandoned wells (Newpark and Lotus, Tex.); (3) underground injection into subsurface formations (producers); and (4) land spreading (producers, only in Texas and New Mexico). Offshore platforms are directly discharging produced waters into the ocean.

With the staggering volume of oil-field produced waters (about 21 billion barrels of produced waters are annually produced compared to 2.5 billion barrels of crude oil) and limited disposal sites, waste minimization strategy similar to the DOE waste strategy is expected to evolve on the federal level to partition NORM into a small volume of ELW for deep down-hole injection, and a large volume of LLW to be safely disposed of at a less expensive cost.

Depending on the salinity and the radioactivity of the produced waters, the invented process that is shown in either FIG. 5 or FIG. 6 or FIG. 7 can be used to separate NORM, attached scale salts, salts with high osmotic pressures, and generate ultra-pure water from the oil-field produced waters. Other possible processing schemes based on the precipitation and MD concepts can also be envisioned.

Treatment of Seawater Flood in Offshore Oil and Gas Reservoirs

In some offshore oil and gas reservoirs, pressure maintenance with water injection is required over the reservoir life. Injection of potable water would prevent scale formation, but it could damage the formation by causing clays in the reservoir matrix to swell and block pores. Direct injection of seawater, with 2,750 ppm of sulfate, would react with barium and/or strontium in the reservoirs, to form barium or strontium sulfate scales. This would lead to: (1) flow problems and consequent plugging in producing wells; and (2) possible attachment of NORM to sulfate scales. Conventional methods of scale prevention with chemical inhibitors proved difficult, expensive, and of a limiting value for protecting the reservoir matrix. Nearly sulfate-free seawater would be acceptable for injection into offshore oil and gas reservoirs. However, this would significantly minimize the scale formation, but would not prevent the potential of scale formation.

Nanofiltration is capable of highly rejecting sulfate salts (>98%), while moderately rejecting chloride salts (10–70%). However, two problems are encountered with use of nanofiltration for seawater treatment. First, the osmotic pressure of seawater is about 400 psia. This would require a high applied membrane pressure to exceed the osmotic pressure, which would significantly increase the operating cost. In offshore areas such as the North Sea, where the temperature of seawater is less than 15° C., to maintain the required volume of waterflood, the applied pressure may easily exceed 700 psia (throughput is temperature dependence), and thus exceed the structural pressure limits of both the membrane and the module. Second, the rejection of 2,750 ppm of sulfate ions by nanofiltration is roughly translated to 11,000 ppm in the concentrate stream, combined with partial rejection of calcium lead to form calcium sulfate, and cause membrane fouling.

The sulfate-free sea water is an ideal application for the invented process. The process that is shown, for instance, in FIG. 5 can be used without the MD step (step four).

Reuse of Produced Waters in Offshore Oil and Gas Reservoirs

A better innovative solution to the waterflood injection in offshore oil and gas reservoirs is to treat the generated produced water, rather than directly discharge it into the ocean, by selectively removing barium, strontium, and radium (if exists), and then reuse it as a waterflood. Three environmental and economic concerns would be resolved. First, radioactive-free and/or scale-free produced water is definitely more compatible with the reservoir matrix than the sulfate-free seawater (salinity differences). Second, the reuse of produced water would help in protecting the ocean aquatic life (radionuclides: NORM; salinity: reaches 200,000 ppm; temperature: reaches 100° C., and dissolved oxygen: depleted). Third, the cost of treating produced water by the proposed process would presumably be cheaper than treating seawater.

Due to high osmotic pressures for most produced waters, nanofiltration cannot be directly applied to such waters. The invented process that is shown in FIG. 5 or FIG. 7 can be employed without the MD step (step four) to separate barium, strontium, and NORM (if exists) from offshore produced waters to be reused as a water flood in offshore reservoirs.

Treatment of Streams in Pressure-Driven Membrane Processes

Reverse osmosis membranes have the capability of rejecting 90% of salts (monovalent and polyvalent). However, nanofiltration membranes are ion-selective; salts with monovalent anions are relatively able to pass through, while salts with polyvalent anions are rejected. Membranes generally at best recover 75% of the feed stream. The remaining 25%, the concentrate stream (secondary waste stream), represents one-fourth of the original feed stream, and thus contains roughly four-times the initial concentrations of the feed species. Both types of membranes are limited by the scale formation as a result of the rejection of excessive concentrations of inorganic foulants (sulfate, carbonate, fluoride, and phosphate in forms of ployvalent cations), which would hinder the permeate throughput and cause membrane fouling. As such, these membranes must be operated in a relatively scale-free manner, which requires feed stream pre-treatment, or recycle concentrate stream post-treatment for selective removal of scale salts.

As shown in Table 1, the osmotic pressures of most DOE waste streams are very high combined with very harsh radiolytic environment would make innovative pressure-driven membranes with molecular recognition agents (ultrafiltration, microfiltration or even nanofiltration) directly inapplicable to real DOE waste streams. These processes are specifically aimed at the selective removal of cesium and strontium, but can not withstand the intensity of the bulk non-radioactive inorganics and the radiolytic environment of the waste.

The invented process without the use of the MD step as shown in FIG. 5 would make an ideal enabling process in conjunction with these pressure-driven membrane processes as a pre-treatment step (control of feed stream) and/or as a post-treatment step (control of concentrate stream).

Treatment of Cooling Towers Blowdown Streams

The lack of adequate supplies of cooling water and environmental regulations have resulted in using cooling towers instead of once-through cooling systems in almost all power-generation plants. To conserve water and to meet the permit requirements, most stations operate at zero liquid discharge. The continuous evaporation of a fraction of the water in the cooling cycle produces minerals in cooling towers blowdown streams. Depending on the source of the plant's water supply (e.g., groundwater, etc.), such minerals become a major scale formation problem (calcium sulfate, and silica). In the context of zero discharge policy, such streams can not be discharged into surface water supplies. Ponding of such streams is very costly (expensive requirements such as necessary land area, liners to prevent seepage into soil and groundwater during prolonged storage, and possible disposal and/or treatment of highly concentrated pond water). As such, to maintain water quality limit, the scale formation minerals must be separated from cooling towers blowdown streams.

The invented process as shown in FIG. 6 without the use of the second-stage MD has a significant potential to be applied for this critical application.

Treatment of Contaminated Groundwater with Road Deicing Salts

The use of sodium chloride, calcium chloride, and anti-caking agents (sodium hexacyanoferrate II) is standard practice to maintain clear and dry highways in climate conditions with significant snowfall. The purpose of using an anti-caking agent is to prevent the formation of large salt clumps. The exposure of sodium hexacyanoferrate II to sunlight, however, would result in decomposing the complex CN (low toxicity) into HCN (high toxicity). The estimated annual road deicing salts consumption in the United States is about 12 million tons. Problems of ground and surface waters contamination are encountered with the use and storage of road deicing salts. States in the northeast of the United States and Canada have appreciable groundwater contamination with chloride salts and total cyanide. The concentrations of chloride salts in some of contaminated groundwaters vary between 200,000 to 300,000 ppm. Pressure-driven membrane processes or membrane distillation can not alone withstand the high osmotic pressures of such contaminated groundwaters.

The invented process that is depicted in FIG. 7 can be effectively applied to separate chloride salts and cyanide from such contaminated groundwaters.

Treatment of Streams Resulting from Plating Facilities

Plating is a process of applying a surface coating to metallic or non-metallic items to impart corrosion resistance, wear resistance, or for decoration. Hence, plating facilities involve a variety of processes such as hard chrome plating, nickel, zinc, or cadmium plating, etching, and phosphating. Each process entails several steps including surface preparation, plating, and post-treatment. All of these steps require water rinsing procedures to rid the part of residues from the previous step, which generate large waste streams.

The invented process as given in FIG. 6, for instance, can be used to serve the double objectives of recovering valuable plating metals, and conserving water by producing recycled water that is suitable for reuse in the plating processes.

Treatment of Streams Containing Inorganics & Organics

Government entities such as the Department of Defense (DOD) operates and maintains a large number of washrack facilities, plating facilities, metal cleaning facilities, and painting and paint stripping facilities. Minimizing fresh water consumption by treating and reusing waste streams provides significant fresh water savings, and reduces the expense of purchasing wastewater facilities, or discharging waste to existing wastewater treatment plants or publicly owned treatment systems.

For instance, the U.S. Navy maintains over 1,450 washrack facilities encompass aircraft, automobiles, and track vehicles. With such a large number of facilities requiring extensive lands, using large amounts of water on a regular basis, and producing a large volume of wastewater containing a diverse portfolio of inorganics (heavy metals: aluminum, cadmium, chromium, lead, nickel, and phosphate), and organics (hydrocarbons: diesel fuel, JP-5 fuel, oils and greases, etc.) innovative processes to create a compact system for treating washrack streams are of a vital interest. Table 2 presents data containing some of the reported concentrations of such contaminants in the Navy washrack streams. The key issue in treating the Navy washrack streams lies in providing a processing system that is capable of effectively treating both inorganics (mainly transition metals) and mixtures of hydrocarbons at acceptable cost.

The phase equilibrium and the transport of petroleum hydrocarbons in aqueous mixtures present a unique challenge in determining the physical, chemical, and toxicological properties of such mixtures. This is attributed to the: (1) complex nature of oil that includes a multitude of hydrocarbons, most of which are difficult to characterize; and (2) dependency of the actual composition of a given hydrocarbons derivative on the raw source of oil (e.g., crude oil, shale oil, coal), the degree of chemical refinement and modification (e.g., cracking), and the physical separation method employed.

Constituents of fresh diesel fuel include: (1) 48% of alkanes and cycloalkanes; (2) 4.5% of benzene and substituted benzene(s); and (3) 32.4% of naphthalene and substituted naphthalene(s). However, the water-soluble fractions of diesel fuel is dominated by soluble aromatics as follows: (1) <0.5% of alkanes and cycloalkanes (heavy aliphatic hydrocarbon with very limited aqueous solubility: $C_{10}$ to $C_{20}$); (2) 25.8% of benzene and substituted benzene(s); and (3) 73.4% of naphthalene and substituted naphthalene(s) (about 40% of $C_{11}$ mostly methylnaphthalenes, and about 23% of $C_{10}$ and $C_{12}$). Gas chromatograph analysis of the water-soluble fractions of diesel fuel reveals the dominance of aromatics (benzene, toluene, xylenes, ethylbenzene, cumene, n-propylbenzene, 1,3,5-trimethylbenzene, 1,2,4-trimethylbenzene, naphthalene, 2-methylnaphthalene, and 1-methylnaphthalene.

JP-5 is a mixture of hydrocarbons that is similar to refined kerosene products. The major constituents of fresh JP-5 fuel include: (1) 68.6% of alkanes and cycloalkanes; (2) 13.7% of benzene and substituted benzene(s); and (3) 5.7% of naphthalene and substituted naphthalene(s). However, the water-soluble fractions of JP-5 fuel is dominated by soluble aromatics as follows: (1) 4.5% of alkanes and cycloalkanes (heavy aliphatic hydrocarbons that remain as insoluble aqueous layer: $C_9$ to $C_{16}$); (2) 63.5% of benzene and substituted benzene(s); and (3) 29.6% of naphthalene and substituted naphthalene(s) (mostly $C_{10}$).

Figure 8:
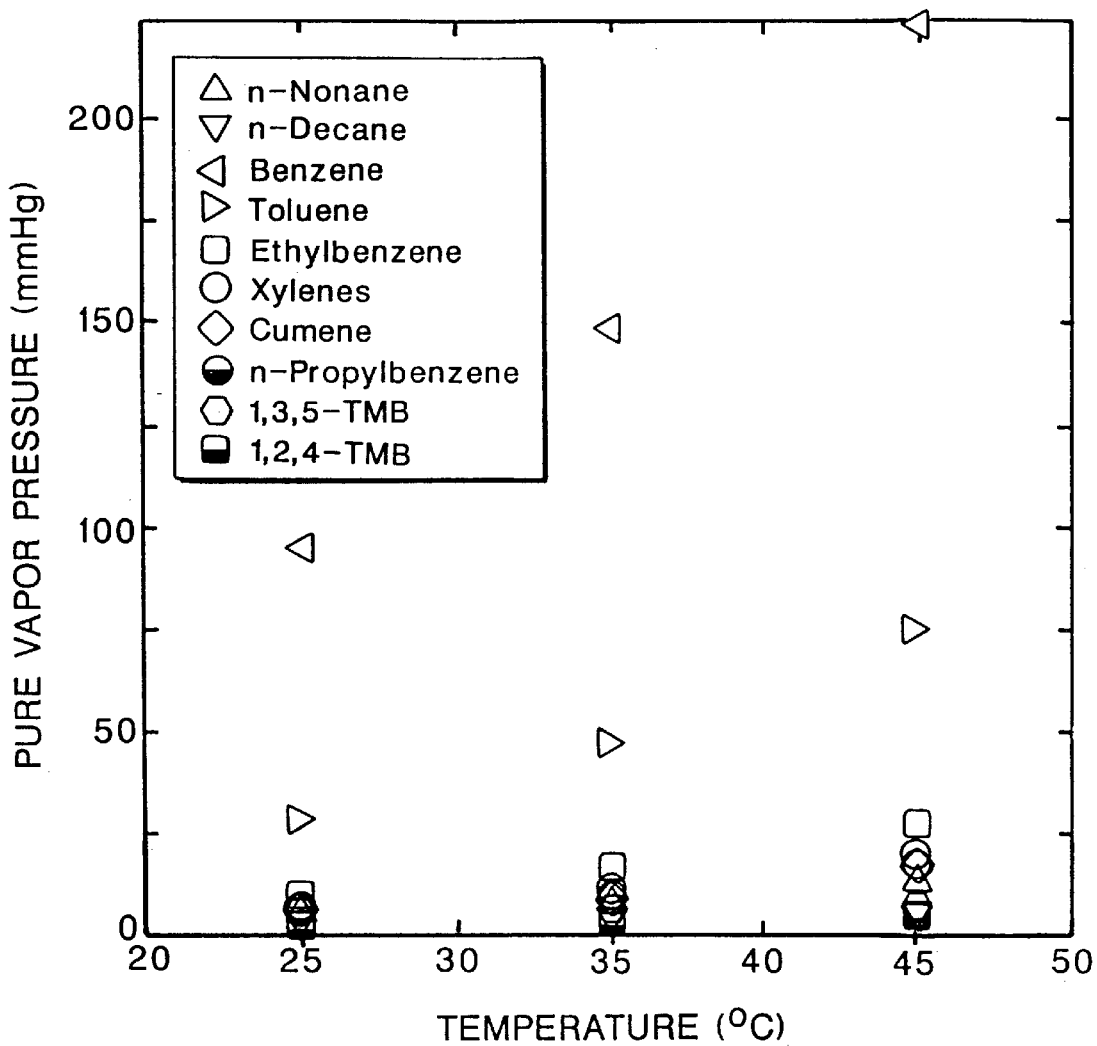
FIG. 8 depicts vapor pressures of volatile organics as a function of temperatures.
Figure 9:
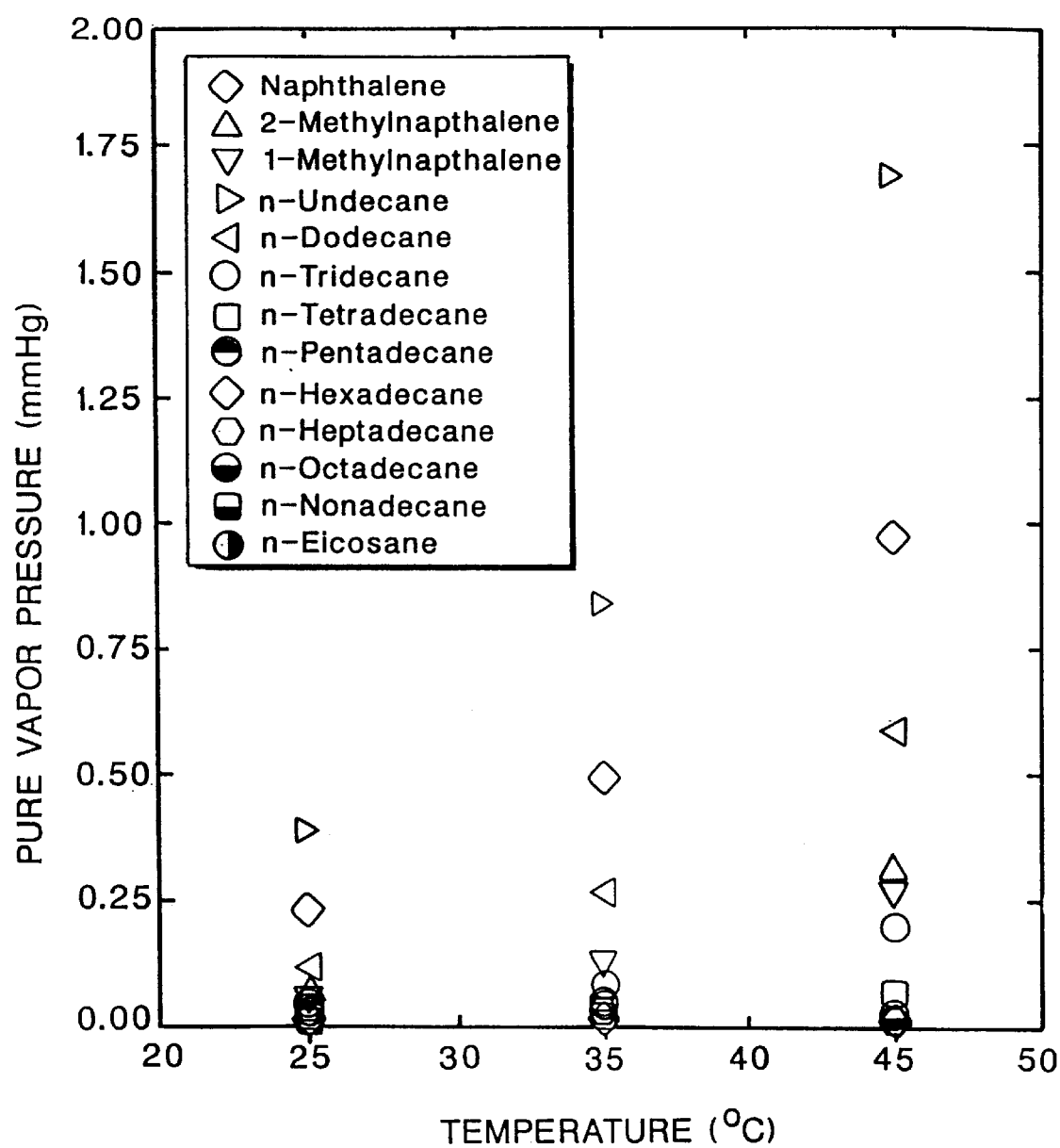
FIG. 9 depicts vapor pressures of non-volatile organics as a function of temperatures.

The study on diesel and JP-5 fuels indicates that water-soluble fractions from higher boiling petroleum products such as crude or applied oils would continue to increase in aromaticity with higher contents of naphthalenes and ploynuclear aromatics. The heavier aromatic and aliphatic hydrocarbons ($>C_{10}$) which are measured in both diesel and JP-5 fuels, possess extremely limited aqueous solubility, and thus remain as an undissolved layer on the water (oily contents). Table 3 presents the chemical and physical properties of hydrocarbons that are likely to exist in the water soluble fractions of diesel and JP-5 fuels. The hydrocarbons are divided into two groups based on their volatility. The term volatile generally refers to species with vapor pressures greater than 1 mmHg at 25° C. or boiling points less than 100° C. FIGS. 8 and 9 depict, respectively, the vapor pressures of volatile and non-volatile hydrocarbons as a function of temperatures.

Two issues are of concerns when using MD for the removal of hydrocarbons from liquid streams. The first issue is the interference of the vapor pressures of volatile hydrocarbons with aqueous vapor flux, which would affect the applicability of the MD process. For instance, the vapor pressure of benzene is 223.5 mmHg at 45° C., as shown in FIG. 8, which is much higher than the water vapor pressure of 71.8 mmHg at 45° C. As such, the practicality of the MD process hinges on its ability to provide steady and acceptable rate of permeate aqueous vapor flux. This would depend on effectively controlling the volatility (vapor pressures), and strippability (aqueous solubilities) of the hydrocarbons in the stream. This can be accomplished by optimizing a pre-concentration step such as the VMD process, which would make direct contributions to the productivity of the MD process.

The second issue is the existence of insoluble non-volatile oily droplets of heavy hydrocarbons ($C_{10}$–$C_{20}$) that may stick to the membrane surface. Such droplets share 73.9% of diesel fuel (0.5% of alkanes and cycloalkanes, and 73.4% of naphthalene and substituted naphthalenes) and 34.1% of JP-5 fuel (4.5% of alkanes and cycloalkanes, and 29.6% of naphthalene and substituted naphthalenes $C_{10}$). Using the concentrations of the diesel fuel (588 ppm) and the JP-5 fuel (288 ppm) that are reported in the Navy washrack streams (Table 2), the concentration of non-volatile hydrocarbons would be 533 ppm, which is consistent with the reported oil and grease contents in the Navy washrack effluents (630 ppm).

My practical experience with oily aqueous streams reveals the following: (1) the pore diameter of the hydrophobic membrane in the MD process is smaller than the oily droplets in water emulsion, and thus the flow of oily droplets through the membrane is generally not expected; (2) the initial concentration of oil contents in the Navy washrack effluents is low, and thus would not hinder the permeate aqueous vapor flux through the membrane; (3) the expected daily intake of the feed stream in the compact washrack system is relatively small, and thus a progressive increase in oil contents on the warm side of the MD (increase in viscosity and consequently decrease in mass transfer coefficient) due pure water evaporation may not significantly affect the permeate aqueous vapor flux; (4) in the case of highly concentrated oily water emulsion stream (e.g., crude oil), increasing the applied pressure in the cold side to be slightly higher than the applied pressure in the warm side of the MD (but not greater than "membrane liquid entry pressure"), would prevent oily droplets from sticking on the membrane surface; and (5) oil skimmers can be used as a pre-treatment step.

Figure 10:
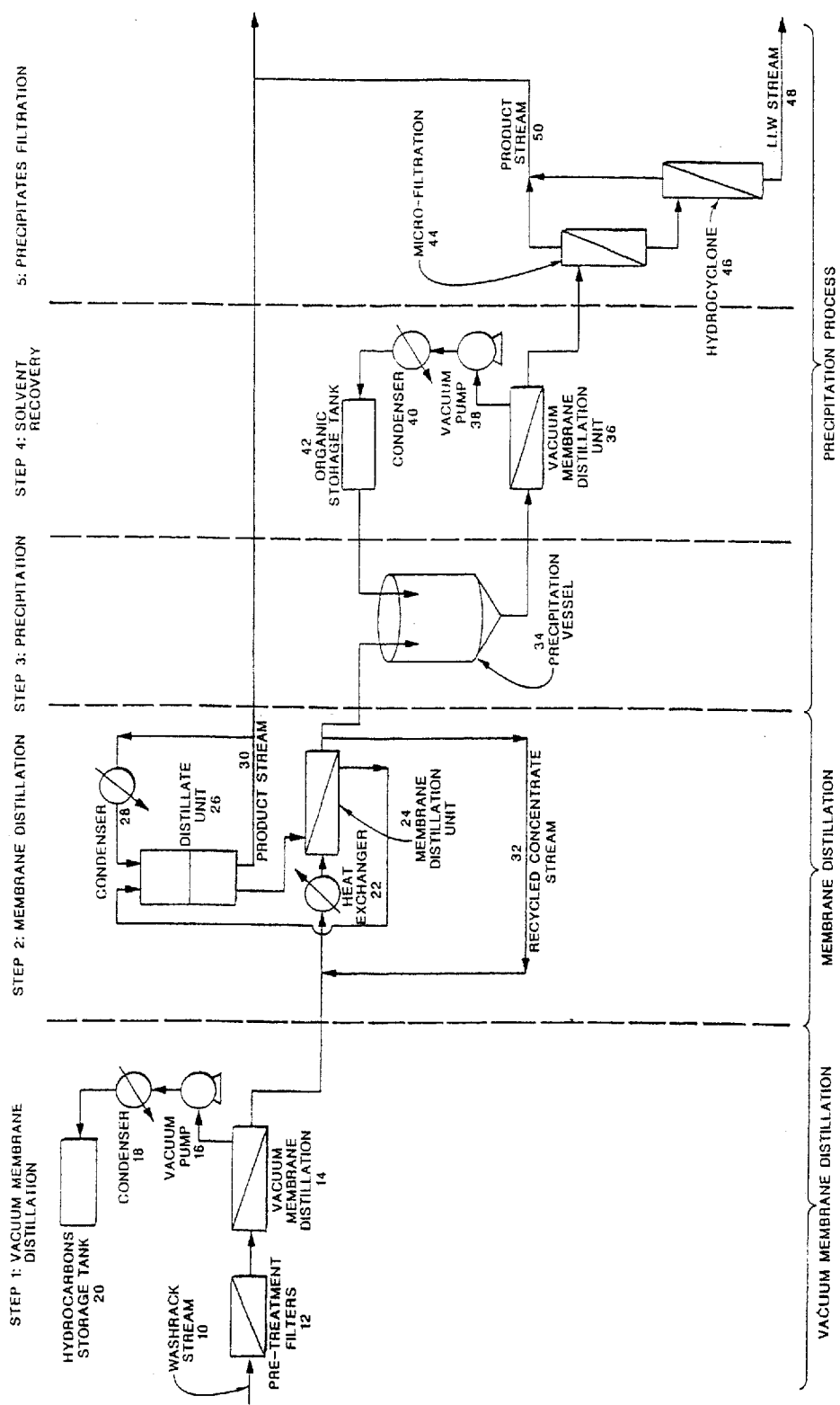
FIG. 10 depicts a simplified hybrid processing flow sheet to treat aqueous streams containing both inorganics and organics.

FIG. 10 depicts a simplified hybrid processing flow sheet to treat aqueous streams containing both inorganic and organic contaminants. In the first step, the Navy washrack stream [10] will be pre-treated with three different filters (screen, coarse, and micro filters) [12] to remove dirt and suspended materials. Oil skimmer can be added, if needed, to the pre-treatment step, particularly with streams containing high concentrations of oily emulsion. The pre-treated Navy washrack stream will then be fed into a VMD unit [14]. The VMD unit will be employed to remove and recover volatile hydrocarbons from the stream. The pressure of the VMD permeate stream will be lowered below the equilibrium pressure in the feed side of the membrane using a vacuum pump [16]. Stripped volatile hydrocarbons in the permeate stream will be condensed via a condenser [18], and then collected in a storage tank [20]. This VMD step serves to separate volatile hydrocarbons, and thus prevents the hydrocarbons vapors from negatively influencing the aqueous vapor permeate flux stream in the MD step (next step).

The VMD concentrate streams will be fed into the MD unit [24] via a heat exchanger or a source of low heat or waste heat [22] to increase the feed temperature. The cooling stream will be pumped from a distillate unit [26] and circulated into the MD unit [24] (counter-current) at constant temperature (e.g., 20° C.). The distillate unit [26] will be connected to a condenser [28] to maintain the cold (permeate) stream temperature. The MD permeate stream [30] is expected to be relatively pure. The MD concentrate stream will be first recycled to the MD feed stream [32]. As the concentrations of inorganics start to build-up, the concentrate stream will then be fed into the precipitation vessel [34], where the precipitation process [34–46] takes place to separate such inorganics as LLW [48] and produce purified stream [50]. It should be pointed out that the MD unit can be replaced with a VMD unit, if the concentrations of greases and oils in the waste stream are relatively low (e.g., washrack stream).

Figure 11:
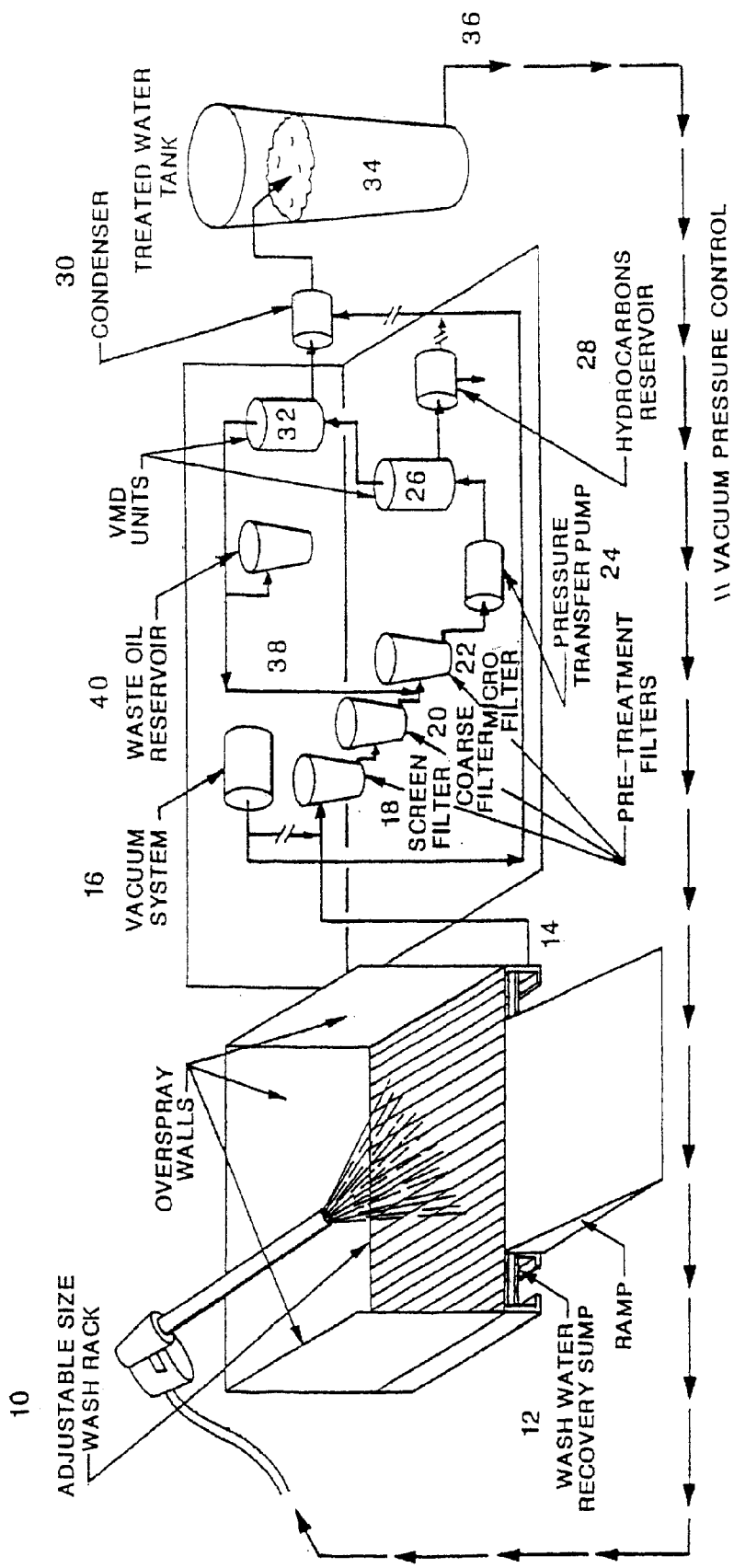
FIG. 11 depicts a compact washrack processing system.

FIG. 11 depicts a possible industrial compact washrack processing system using VMD-VMD combination (or possibly VMD-MD) taking into account the extreme low concentrations of transition metals. FIG. 11 is based on the flow sheet that is shown in FIG. 10 without the use of the precipitation step. However, the precipitation step can be added to the compact system as needed (depending on the concentrations of inorganics in the stream). Rinse water [14] from wash operations is collected from the adjustable washrack [10] via recovery sump [12] using a vacuum system [16]. The rinse water will be fed under vacuum into a screen filter [18], a coarse filter [20], and a micro filter [22] to remove dirt and suspended materials. The filtered rinse water will then be pumped to the first VMD unit [26] via a low pressure transfer pump [24]. The purpose of first VMD unit is to remove and recover volatile hydrocarbons from the stream. The pressure of the first VMD permeate stream will be lowered below the equilibrium pressure in the feed side of the membrane using a vacuum system [16]. The permeate stream which contains removed volatile hydrocarbons will be condensed via a condenser [30], and collected in a hydrocarbons reservoir [28].

The concentrate stream of the first VMD unit will be fed into a second VMD unit [32]. The pressure of the permeate stream in the second VMD will be lowered below the equilibrium pressure in the feed side of the membrane using a vacuum system [16]. The permeate aqueous stream will be condensed via a condenser [30], and collected in a treated water holding tank [34] to be reused as washing water [36]. The concentrate stream [38] of the second VMD unit will be recycled to the feed stream of the coarse filter [20] via a waste oil reservoir [40]. The waste oil reservoir [40] will be used to trap insoluble non-volatile oil contents. The invented compact washrack system provides a minimal wastewater discharge system for the reclamation and reuse, for instance, of washrack effluent streams.

Another example of waste streams containing both inorganics and organics is landfill leachate. Current landfill design protects groundwater from contamination by installing low permeability lining to prevent the off-site dispersal of leachate. This design, however, would lead to collect leachate at the base of the landfill, which would lead to possible soil and groundwater contamination. The most common approach for managing leachate today is to transport untreated leachate in tanker trucks for treatment in wastewater treatment plants or publicly owned treatment works. On-site leachate treatment would eliminate the limited acceptance (due discharge standards) and reduce the cost of disposal in wastewater treatment plants. Most leachates have three distinct classes of species: transition metals, inorganic salts, and organics. The invented process as given in FIG. 10 can be used with such streams to separate organics, transition metals, and salts. If transitions metals and salts are the only contaminants of concerns, such contaminants can be effectively targeted by the invented process as given, for instance, in FIG. 5 or FIG. 7.

A further example of streams containing both inorganics and organics is offshore ships oil spills and platforms blowouts. An inevitable consequence of ships traffic across the ocean and oil exploration in offshore regions is that a large quantities of oil are discharged accidentally or deliberately to the oceans via oil tanker spills, ships waste spills (waste oil and heating fuels), and offshore oil and gas platforms blowouts. This would inflict tremendous damages to huge expanses of the marine environment. As such, there is a continuing concern about the physical, biological, aesthetic, climatic, and economic of marine oil discharges. It should be pointed out that the high concentrations of salts in seawater increase significantly the volatility, and thus the strippability of volatile hydrocarbons.

Also an example of streams containing both organics and inorganics is contaminated groundwaters with hydrocarbons (gasoline, kerosene, jet fuel, stoddard solvents, diesel, and heavy naphthas). Petroleum hydrocarbons and their derivatives enter into soil and groundwater primarily through several operations and accidents such as rail car and trucking accidents, pipeline ruptures, failure of underground storage tanks, and road oil for dust suppression. As such, groundwater contamination has been found in every state in the nation. A leak of a single gallon of gasoline, for instance, can render a million gallons of groundwater unpalatable as drinking water. It was estimated that about 29% of the drinking water supplied for large cities by groundwater is contaminated with petroleum hydrocarbons and other chemicals, and about 1% of the nation groundwater supply is polluted to the extent that it is almost beyond remediation.

This invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention as defined by the appended claims.

TABLE 1

Concentration and Osmotic Pressure Profiles for Some of the DOE Waste Streams

| Species | N-Springs | NCAW | | | DSSF-7 | | |
|---|---|---|---|---|---|---|---|
| | I | I | II | III | I | II | III |
| $NaNO_3$ | — | 21,930.00 | 189.3 | 204.2 | 35,274.00 | 307.1 | 333.0 |
| $KNO_2$ | — | 12,120.00 | 87.0 | 93.8 | 95,445.00 | 741.8 | 799.8 |
| $Na_2SO_4$ | — | 21,300.00 | 164.6 | 177.5 | 1,136.00 | 8.6 | 9.3 |

TABLE 1-continued

Concentration and Osmotic Pressure Profiles for Some of the DOE Waste Streams

| Species | N-Springs I | NCAW I | NCAW II | NCAW III | DSSF-7 I | DSSF-7 II | DSSF-7 III |
|---|---|---|---|---|---|---|---|
| $Na_2HPO_4$ | — | 3,550.00 | 27.0 | 29.1 | 1,988.00 | 15.1 | 16.3 |
| NaOH | — | 136,000.00 | 2,723.0 | 2,936.1 | 185,360.00 | 3,881.2 | 4,184.9 |
| $Al(NO_3)_3$ | — | 91,590.00 | 2,509.6 | 2,705.9 | 153,360.00 | 5,537.1 | 5,970.4 |
| $Na_2CO_3$ | 13.25 | 24,380.00 | 252.9 | 272.7 | 15,582.00 | 160.3 | 172.9 |
| NaF | 0.44 | 3,738.00 | 64.0 | 69.0 | — | — | — |
| NaCl | — | — | — | — | 5,962.00 | 73.5 | 79.2 |
| $NaNO_2$ | — | 29,670.00 | 316.4 | 341.1 | 104,328.00 | 1,191.8 | 1,285.1 |
| $RbNO_3$ | — | 7.40 | — | — | — | — | — |
| $CsNO_3$ | — | 97.0 | — | — | 13.65 | — | — |
| $Ca(NO_3)_2$ | — | 15.66 | — | — | — | — | — |
| $CaCl_2$ | 2.51 | — | — | — | — | — | — |
| $Ca(OH)_2$ | 45.10 | — | — | — | — | — | — |
| $Ba(OH)_2$ | 0.02 | — | — | — | — | — | — |
| $MgSO_4$ | 25.92 | — | — | — | — | — | — |
| $Sr(NO_3)_2$ | — | 0.31 | — | — | 0.08 | — | — |

N-Springs: Groundwater;
NCAW: Neutralized Current Acid Waste;
DSSF-7: Double Shell Tank Slurry
I: Concentration (ppm);
II: Osmotic Pressure at 25° C. (psia);
III: Osmotic Pressure at 45° C. (psia)

TABLE 2

Navy Washrack Effluent Data

| Species | Concentration (ppm) |
|---|---|
| Aluminum | 3.40E − 3 |
| Cadmium | 4.30E − 1 |
| Chromium | 2.30E − 1 |
| Lead | 1.40E − 1 |
| Nickel | 1.50E − 1 |
| Total Phosphate | 7.70E + 0 |
| TPH Diesel | 5.88E + 2 |
| TPH JP-5 | 2.88E + 2 |
| Benzene | 7.50E − 2 |
| Butylbenzenephthalate | 1.06E + 0 |
| 2,4-Dichlorophenol | 2.69E + 1 |
| Total Suspended Solids (TSS) | 5.90E + 3 |
| Oils & Greases | 6.30E + 2 |
| BOD | 2.76E + 3 |
| COD | 4.68E + 3 |

TABLE 3

Properties for Hydrocarbons in Diesel and JP-5 Fuels

| Species | AS | VP | HC | BP |
|---|---|---|---|---|
| Volatile | | | | |
| Benzene | 176E + 01 | 952E − 01 | 5566E − 06 | 80.1 |
| Toluene | 542E + 00 | 284E − 01 | 6356E − 06 | 110.6 |
| Ethylbenzene | 165E + 00 | 950E − 02 | 8043E − 06 | 136.0 |
| Xylenes | 199E + 00 | 662E − 02 | 5637E − 06 | 140.6 |
| Cumene | 500E − 01 | 518E − 02 | 1450E − 05 | 153.2 |
| n-Propylbenzene | 522E − 01 | 337E − 02 | 1021E − 05 | 157.0 |
| 1,3,5-Trimethylbenzene | 655E − 01 | 242E − 02 | 3592E − 06 | 176.1 |
| 1,2,4-Trimethylbenzene | 570E − 01 | 203E − 02 | 5633E − 06 | 169.1 |
| n-Nonane | 122E − 03 | 425E − 02 | 5932E − 03 | 150.7 |
| n-Decane | 520E − 04 | 130E0 − 2 | 4717E − 03 | 173.7 |
| Non-Volatile | | | | |
| Naphthalene | 321E − 01 | 230E − 03 | 1229E − 06 | 218.0 |
| 1-Methylnaphthalene | 300E − 01 | 540E − 04 | 3600E − 07 | 244.7 |
| 2-Methylnaphthalene | 254E − 01 | 680E − 04 | 4990E − 07 | 241.1 |
| n-Undecane | 140E − 04 | 390E − 03 | 1830E − 03 | 196.0 |
| n-Dodecane | 110E − 04 | 120E − 03 | 7175E − 03 | 216.4 |
| n-Tridecane | 120E − 04 | 330E − 04 | 2313E − 03 | 235.5 |
| n-Tetradecane | 130E − 04 | 958E − 05 | 1130E − 03 | 253.6 |
| n-Pentadecane | 140E − 04 | 262E − 05 | 4790E − 04 | 270.7 |
| n-Hexadecane | 150E − 04 | 673E − 06 | 2277E − 04 | 286.9 |

AS: Aqueous Solubility at 25° C. (ppm);
VP: Vapor Pressure at 25° C. (mmHg);
HC: Henry's Constant at 25° C. (atm-m$^3$/mol);
BP: Boiling Point (° C.).

What is claimed is:

1. A method of treating an aqueous stream having inorganic material dissolved therein, said method comprising the steps of:
   (a) adding organic solvent to said aqueous stream in an amount effective to form an precipitate comprising at least a portion of said inorganic material, said organic solvent having an increased relative volatility in said aqueous stream in the presence of said inorganic material;
   (b) removing at least most of said organic solvent from said aqueous stream by vacuum membrane distillation;
   (c) after step (b), removing at least most of said precipitate from said aqueous stream.

2. The method of claim 1 wherein said organic solvent is isopropylamine, ethylamine, or a combination thereof.

3. The method of claim 1 wherein said vacuum membrane distillation is conducted in step (b) using a membrane having a liquid entry pressure and wherein said aqueous stream is fed to said membrane in step (b) at a hydrostatic pressure less than said liquid entry pressure.

4. The method of claim 1 wherein:
   said inorganic material is a first inorganic material;
   said aqueous stream further includes a second inorganic material dissolved therein; and said method further comprises the step, after step (c), of
distilling said aqueous stream by membrane distillation
to produce an aqueous permeate product and a concentrate product comprising at least most of said second
inorganic material.

5. The method of claim 4 wherein said first inorganic material is a radioactive material.

6. A method of treating an aqueous stream having inorganic material dissolved therein, said method comprising the steps of:
   (a) adding organic solvent to said aqueous stream in an amount effective to form a precipitate comprising at least a portion of said inorganic material, said organic solvent having an increased relative volatility in said aqueous stream in the presence of said inorganic material;
   (b) removing at least most of said organic solvent from said aqueous stream by vacuum membrane distillation;
   (c) after step (b), removing at least most of said precipitate from said aqueous stream to produce an intermediate aqueous product; and
   (d) distilling said intermediate aqueous product by membrane distillation to produce an aqueous permeate product.

7. The method of claim 1 wherein:
   said inorganic material is a member of the group consisting of rubidium, cesium, strontium, francium, scandium, yttrium, lanthanum, actinium, chromium, cobalt, cadmium, mercury, nickel, zinc, iron, europium, cerium, praseodymium, neptunium, plutonium, americium, curium, nobelium, technetium, ruthenium, iodine (I-129), carbon (C-14), tritium (H-3), cyanide, and combinations thereof and
   said organic solvent is selected from the group consisting of isopropylamine, ethylamine, propylamine, diisopropylamine, diethylamine, dimethylamine, and combinations thereof.

8. The method of claim 1 wherein said organic solvent is isopropylamine, ethylamine, or a combination thereof.

9. The method of claim 1 wherein:
   said portion of said inorganic material precipitated in step (a) is a second portion of said inorganic material;
   said precipitate formed in step (a) is a second precipitate; and
   said method further comprises the steps, prior to step (a), of
      (i) adding organic solvent to said aqueous stream in an amount effective to form a first precipitate comprising a first portion of said inorganic material,
      (ii) removing from said aqueous stream at least most of said organic solvent added to said aqueous stream in step (i), and
      (iii) after step (ii), removing at least most of said first precipitate from said aqueous stream.

10. The method of claim 9 wherein:
    said organic solvent added in step (i) is removed in step (ii) by vacuum membrane distillation, and
    said organic solvent added in step (a) is removed in step (b) by vacuum membrane distillation.

11. The method of claim 7 wherein:
    said first portion of said inorganic material comprises radioactive material and a concentrated, high level waste material comprising said first precipitate is removed from said aqueous stream in step (iii).

12. The method of claim 8 wherein:
    said second portion of said inorganic material comprises non-radioactive material and a concentrated, low level waste material comprising said second precipitate is removed from said aqueous stream in step (c).

13. A method of treating an aqueous stream having inorganic material dissolved therein at a concentration sufficiently low for direct treatment of said aqueous stream by membrane distillation, said method comprising the steps of:
    (a) distilling said aqueous stream by membrane distillation to produce an aqueous permeate product and an intermediate concentrate comprising at least most of said inorganic material;
    (b) adding organic solvent to said intermediate concentrate in an amount effective to form a precipitate comprising at least a portion of said inorganic material, said organic solvent having an increased relative volatility in said intermediate concentrate in the presence of said inorganic material;
    (c) removing at least most of said organic solvent from said intermediate concentrate by vacuum membrane distillation; and
    (d) after step (c), removing at least most of said precipitate from said intermediate concentrate to produce a concentrate product and an at least partially purified aqueous product.

14. The method of claim 10 further comprising the step, following step (d), of (e) distilling said at least partially purified aqueous product by membrane distillation to produce a second aqueous permeate product.

15. The method of claim 10 wherein:
    said inorganic material is a member of the group consisting of rubidium, cesium, strontium, francium, scandium, yttrium, lanthanum, actinium, chromium, cobalt, cadmium, mercury, nickel, zinc, iron, europium, cerium, praseodymium, neptunium, plutonium, americium, curium, nobelium, technetium, ruthenium, iodine (I-129), carbon (C-14), tritium (H-3), cyanide, and combinations thereof and
    said organic solvent is selected from the group consisting of isopropylamine, ethylamine, propylamine, diisopropylamine, diethylamine, dimethylamine, and combinations thereof.

16. The method of claim 10 wherein said organic solvent is isopropylamine, ethylamine, or a combination thereof.

17. The method of claim 10 wherein said inorganic material comprises radioactive material which is precipitated in step (b) and is removed from said intermediate concentrate product in step (d) in said concentrate product.

18. The method of claim 10 further comprising the step, prior to step (a), of removing dirt and suspended materials from said aqueous stream by filtration.

19. The method of claim 10 further comprising the step, prior to step (a), of removing volatile hydrocarbons from said aqueous stream by vacuum membrane distillation.

20. A method of treating an aqueous stream having inorganic material dissolved therein and said aqueous stream also having an volatile organic material therein, said method comprising the steps of:
    (a) removing said volatile organic material from said aqueous stream by vacuum membrane distillation;
    (b) then adding organic solvent to said aqueous stream in an amount effective to form a precipitate comprising at least a portion of said inorganic material, said organic solvent having an increased relative volatility in said aqueous stream in the presence of said inorganic material;

(c) removing at least most of said organic solvent from said aqueous stream by vacuum membrane distillation; and (d) after step (c), removing at least most of said precipitate from said aqueous stream.

21. The method of claim 20 further comprising the step, prior to step (a), of filtering said aqueous stream to remove dirt and suspended materials.

22. A method of treating an aqueous stream having inorganic material dissolved therein and said aqueous stream also having a volatile organic material therein, said inorganic material being present at a concentration sufficiently low for direct treatment of said aqueous stream by vacuum membrane distillation but for the presence of said volatile organic material, said method comprising the steps of:

(a) removing said volatile organic material from said aqueous stream by vacuum membrane distillation;

(b) distilling said aqueous stream by membrane distillation to produce an aqueous permeate product and a concentrate comprising at least most of said inorganic material;

(c) adding organic solvent to said concentrate in an amount effective to form a precipitate comprising at least a portion of said inorganic material, said organic solvent having an increased relative volatility in said intermediate concentrate in the presence of said inorganic material;

(d) removing at least most of said organic solvent from said intermediate concentrate by vacuum membrane distillation; and (e) after step (d), removing at least most of said precipitate from said intermediate concentrate to produce a concentrate product and an at least partially purified aqueous product.

* * * * *